United States Patent

[11] 3,599,176

[72] Inventors Humberto Cordero, Jr.
Endicott;
Edward G. Drimak, Johnson City; Richard J. Hutchinson, Vestal; Michael F. Schaughency, Endwell; Everett M. Shimp, Endwell, all of, N.Y.

[21] Appl No. 695,081
[22] Filed Jan. 2, 1968
[45] Patented Aug. 10, 1971
[73] Assignee International Business Machines Corporation
Armonk, N.Y.

[54] MICROPROGRAMMED DATA PROCESSING SYSTEM UTILIZING IMPROVED STORAGE ADDRESSING MEANS
15 Claims, 22 Drawing Figs.

[52] U.S. Cl. 340/172.5, 235/157
[51] Int. Cl. G06f 9/16
[50] Field of Search 340/172.5; 235/157

[56] References Cited
UNITED STATES PATENTS

| | | | |
|---|---|---|---|
| 3,029,414 | 4/1962 | Schrimpf | 340/172.5 |
| 3,247,490 | 4/1966 | Kregness et al. | 340/172.5 |
| 3,344,404 | 9/1967 | Curewitz | 340/172.5 |
| 3,359,544 | 12/1967 | Macon et al. | 340/172.5 |
| 3,369,221 | 2/1968 | Lethin et al. | 340/172.5 |
| 3,404,378 | 10/1968 | Threadgold et al. | 340/172 5 |

*Primary Examiner*—Paul J. Henon
*Assistant Examiner*—Melvin B. Chapnick
*Attorneys*—Hanifin and Jancin and Carl W. Laumann, Jr.

ABSTRACT: A data processing system characterized by a high speed local storage unit used for storage of addresses and data involved in a variety of operations. Accesses to a main storage unit, containing both macroprogram and microprogram information, is under the control of addresses held in local storage. Transfer from a main line program to an interrupt subroutine is also handled by the local storage unit.

INVENTORS
HUMBERTO CORDERO JR.
EDWARD G. DRIMAK
RICHARD J. HUTCHINSON
MICHAEL F. SCHAUGHENCY
EVERETT M. SHIMP

BY [signature]
ATTORNEY

*FILE SHARE CYCLES*

READ

| *STORAGE WORD BITS* | W 0 | T 1 | S 2 | C 3 | A-SOURCE 4 | 5 | 6 | 7 | B-SOURCE 8 | 9 | 10 | 11 | 12 | MC 13 | 14 | WT 15 |
|---|---|---|---|---|---|---|---|---|---|---|---|---|---|---|---|---|
| **FIRST READ CYCLE** | | | STORE STORAGE | | | | | BYTES | DATA ADDR T-REG | | | MS | STOR LS +1 | | | |
| *RESULTING STRUCTURE* | 0 | 1 | 1 | 1 | 0 | 0 | 0 | 1 | 1 | 0 | 1 | 1 | 1 | 0 | 0 | 0 |

*FORCED BY FILE READ COMMAND*

FIG. 10a

| *STORAGE WORD BITS* | W 0 | T 1 | S 2 | C 3 | A-SOURCE 4 | 5 | 6 | 7 | B-SOURCE 8 | 9 | 10 | 11 | 12 | MC 13 | 14 | WT 15 |
|---|---|---|---|---|---|---|---|---|---|---|---|---|---|---|---|---|
| **SECOND READ CYCLE** | | | | | | | | BYTES | COUNT I-REG | | | MS | STOR LS -1 | | | |
| *RESULTING STRUCTURE* | 0 | 1 | 0 | 1 | 0 | 0 | 0 | 1 | 1 | 0 | 0 | 0 | 1 | 0 | 1 | 0 |

*FORCED BY SECOND SHARE CYCLE AT T0 TIME*

FIG. 10b

WRITE

| *STORAGE WORD BITS* | W 0 | T 1 | S 2 | C 3 | A-SOURCE 4 | 5 | 6 | 7 | B-SOURCE 8 | 9 | 10 | 11 | 12 | MC 13 | 14 | WT 15 |
|---|---|---|---|---|---|---|---|---|---|---|---|---|---|---|---|---|
| **FIRST WRITE CYCLE** | | | READ STORAGE | | | | | BYTES | DATA ADDR T-REG | | | MS | STOR LS +1 | | | |
| *RESULTING STRUCTURE* | 0 | 1 | 0 | 1 | 0 | 0 | 0 | 1 | 1 | 0 | 1 | 1 | 1 | 0 | 0 | 0 |

*FORCED BY FILE WRITE COMMAND*

FIG. 10c

| *STORAGE WORD BITS* | W 0 | T 1 | S 2 | C 3 | A-SOURCE 4 | 5 | 6 | 7 | B-SOURCE 8 | 9 | 10 | 11 | 12 | MC 13 | 14 | WT 15 |
|---|---|---|---|---|---|---|---|---|---|---|---|---|---|---|---|---|
| **SECOND WRITE CYCLE** | | | | | | | | BYTES | COUNT I-REG | | | MS | STOR LS -1 | | | |
| *RESULTING STRUCTURE* | 0 | 1 | 0 | 1 | 0 | 0 | 0 | 1 | 1 | 0 | 0 | 0 | 1 | 0 | 1 | 0 |

*FORCED BY SECOND SHARE CYCLE AT T0 TIME*

FIG. 10d

MICROPROGRAMMED DATA PROCESSING SYSTEM UTILIZING IMPROVED STORAGE ADDRESSING MEANS

BACKGROUND OF THE INVENTION

1. Field of the Invention

This invention relates generally to electronic data processing systems and, more particularly, to such systems operating according to microprogramming techniques or utilizing a high speed local storage unit for the maintenance of addresses and data.

2. Description of the Prior Art

Microprogramming techniques have been known and utilized for the control of data processing systems for some time. The following literature references are illustrative:

a. M. V. Wilkes, "The Best Way to Design an Automatic Calculating Machine," Manchester University Computer Inaugural Conference, Manchester, England, July 1951.

b. M. V. Wilkes, J. B. Stringer, "Microprogramming and the Design of Control Circuits in an Electronic Digital Computer," Proceedings, Cambridge Philosophical Society, Vol. 49, pt. 2, Apr. 1953.

c. M. V. Wilkes, "Microprogramming," Proceedings Eastern Joint Computer Conference, 1958.

d. E. M. Grabbe, S. Ramo, D. E. Wooldridge, (eds.), "Handbook of Automation Computation and Control, Vol. 2," John Wiley, 1959.

e. J. T. Gilmore, Jr., H. P. Peterson "A Fundamental Description of the TX–O Computer," Memorandum 6M–4789b, Lincoln Laboratories, M. I. T., Oct. 3, 1958.

f. M. V. Wilkes, W. Renwick, D. J. Wheeler, "The Design of the Control Unit of an Electronic Digital Computer," Proceedings IEE Vol. 105, pt. B, Mar. 1958.

The tendency has been to store the microprogram information in a read-only storage unit. There are a number of reasons for this. First, it avoids the problem of addressing two kinds of information in a single storage unit. Second, it prevents the inadvertent destruction of control information which is absolutely essential to the system operation. The use of read-only store is not without disadvantages. The most significant disadvantages are the relatively higher cost and the inflexibility which accompany its use.

Some of the disadvantages can be overcome by the use of separate writable storage units for program and control information. This solution is only partially effective from the cost standpoint. The fullest advantage can be obtained by the use of a single storage unit to contain both program and control information. This approach has been largely ignored due to the difficulty of handling the addressing, together with the fact that control and program information cannot be simultaneously obtained from storage.

Accordingly, it is a general object of this invention to provide an improved data processing system.

A particular object of the invention is to provide an improved microprogrammed data processing system.

Another particular object of the invention is to provide an improved local storage unit for a data processing system.

A specific object of the invention is to provide an improved means for transferring data to or from a data processing system where the format of the data being transferred must be altered or monitored during the transfer.

Another specific object of the invention is to provide an improved means for performing input/output (I/O) operations in a data processing system.

Still another specific object of the invention is to provide an improved means for addressing a local storage unit.

A further specific object of the invention is to provide an improved means for handling interrupt requests.

Yet another specific object of the invention is to provide an improved local storage unit for handling interrupt routines..

SUMMARY OF THE INVENTION

In accordance with one aspect of the invention, data may be transferred between an I/O device, such as a disk file, and core storage within the central processing unit while preserving the arbitrary division of storage by word marks or group mark word marks or any other arbitrary set of selected characters.

A microroutine loop two instructions long causes the central processing unit (CPU) to fetch a character from core storage. This character is investigated to determine whether or not it is a special character. Depending on the mode of the transfer, the special characters may be stripped, modified or left unchanged. Further, control action, such as terminating the transfer, may be taken when a special character is recognized. Since the fetching from the addressed location in core storage is performed before the data from an external device is available, there is essentially no delay caused by the comparison of the character being investigated with the special character to determine whether or not a match exists.

The second microinstruction merely branches back to the first. While the first microinstruction includes a bit pattern which is effective to increment the data address in main storage, this portion is inhibited until the data transfer is complete. The two instruction loop merely continues to loop until the data transfer is complete, at which point the data address is incremented to fetch the next character.

A second aspect of the invention relates to the manner in which the actual data transfer between the CPU and I/O devices is effected. In the case of microprogrammed systems, I/O operations are usually performed on an interrupt basis by a series of microinstructions which set up the various gates and addressing circuits to effect the transfer.

While this approach is satisfactory in some cases, it has the disadvantage of requiring an undue amount of time simply for reading the microinstructions from storage. There is a further problem presented by the microprogram approach in that this usually requires a certain amount of "housekeeping" to prevent the loss of information contained in registers which are used in the interrupt routine.

In this invention, the selected interrupt signal is effective to force an arbitrary bit pattern into the control register. This bit pattern is similar to that which would be placed in the control register by an interrupt routine used for the same purpose. However, the pattern is forced without an access to main storage for control information. Further, no time is lost in preserving registers which are not used in the routine.

The usual I/O operation will require more than one load into the control register. The subsequent bit patterns are forced by a series of latches which are actuated in sequence.

The result is a system which can accommodate I/O operations at virtually any point in a program without concern for the storage of registers or the consumption of an undue amount of time.

Another aspect of the invention provides a novel means for developing addresses in a local storage unit. In the described embodiment, the local storage unit contains 64 bytes of information. The 64 bytes are grouped into six zones. One zone has 16 bytes and the other five have 8 bytes each. The remaining 8 bytes are addressable with any one of four of the 8-byte zones.

While the exact function of local storage will subsequently be described in greater detail, it is sufficient to consider it as a temporary repository for data, main storage addresses, counters and indicators.

Each zone contains the information relating to a particular class of operation. For example, one zone of 16 bytes is used for the CPU class or mode of operation. An 8-byte zone is used in the card reader-punch mode. A further 8-byte zone is used in the mode which is operative during data transfers involving a disk file.

In geometric terms, the zone may be considered as the Y address while the particular byte within the zone is the X address. The X addresses are selected according to the content of the control register. Certain bit positions of the microinstruction in the control register are decoded and used in the local storage address assembler to generate an X address representing a byte.

The Y address is generated in an entirely different fashion from two primary sources. The first source is the mode register. Selection of the Y address or zone will normally be made according to the value of certain bit positions in the mode register. One of two bits from the control register is also used in the selection of the Y address. However, when an interrupt condition requires service, as indicated by the presence of data bits in a MMSK register, the mode register is degated and the MMSK register controls selection of the zone address.

Another aspect of the invention relates to the handling of the major control functions associated with various interrupt routines at different priority levels. The usual approach of buffering the control points when the routine is branched from and then restoring the information upon return to the routine requires either an excessive amount of hardware or undue time if microprogramming is used.

The MMSK register contains a bit pattern representative of those devices which are requesting an interrupt. The Mode register is normally used to determine the zone address of local storage. The presence of any bit in the MMSK register, representing a device requesting service, totally degates the Mode register from the addressing circuits of local storage and substitutes the MMSK instead.

By tying the selection of control points to the highest priority bit in the MMSK register, a particular set of control points may be made active for each priority level without hardware or programmed buffering.

The Mode register serves to control the selection of the zone addressed in local storage as well as controlling the gating of externals such as the various registers associated with I/O devices.

Another aspect of the invention includes the means for entering the interrupt (trap) request signals into the MMSK register.

The trap request lines are combined in a logical array to develop a main storage address representative of the highest priority line requesting service. At the same time, the presence of an active trap request line causes the normal source (MO—M1 Register) of the next storage address to be degated and the output of the trap address generator substituted instead.

The forced storage address contains the first microinstruction of a routine which is effective to set a bit into the MMSK register representing the highest priority line requesting service. The presence of a bit pattern in the MMSK register operates to degate the Mode register from the local storage address generator and substitute the MMSK register outputs instead.

Since the zone address of the local storage unit is determined by the output of either the Mode or MMSK register, control of the system, as determined by the active zone address, is easily shifted to the highest priority line requesting service.

An instruction exists in the repertoire of the system which allows a bit to be entered into the MMSK register by means of microprogramming. This allows the programmer to block out certain priority levels. This particular bit in the MMSK register does not effect a change in the zone address and the Mode register remains in control of the local storage zone address.

The foregoing and other objects, features and advantages of the invention will be apparent from the following more particular description of a preferred embodiment of the invention, as illustrated in the accompanying drawings.

DESCRIPTION OF THE DRAWINGS

FIGS. 10*a*—10*d* are the bit patterns forced into the control register for the control cycles used to transfer information between a disk file and the CPU.

DESCRIPTION OF SYSTEM DATA FLOW

Figure 1:
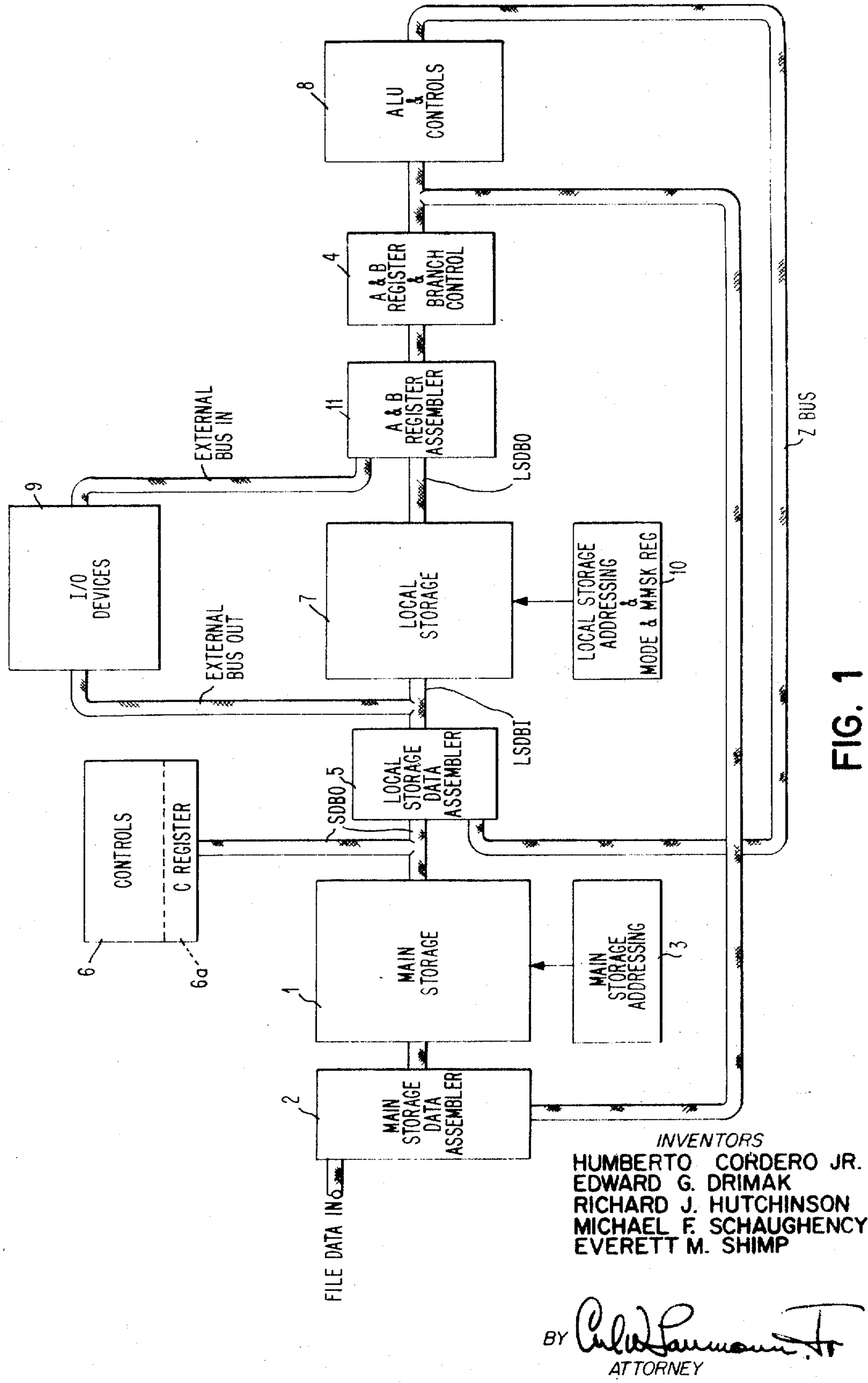
FIG. 1 is a system diagram illustrating the primary elements and data flow paths of the preferred embodiment of the invention.

FIG. 1 is representative of the data flow of the computing system of this invention. Main storage unit 1 contains the program information as well as the information used for control purposes. To distinguish between the two types of information, that relating to programs will be designated macroprogram information and that which is used for control purposes will be termed microprogram information. While both types of information are contained in the same storage unit they are stored in different sections. The microprogram information is located in the higher address regions. Addressing of main storage unit 1 is accomplished by main storage addressing unit 3.

Data to be stored in main storage unit 1 is placed in main storage data assembler 2. This data comes from two primary sources, external devices such as disk files, and the A and B registers 4. The functions of these registers will be explained later. Data which is read from main storage 1 is sent to local storage assembler 5 if it represents macroprogram information or to the control or C register and its associated controls 6 if it represents control or microprogram information. The output of C register 6*a* is decoded to bring up the gating and branching lines necessary to perform the functions called for by the control word. Local storage unit 7 is a high speed storage device of relatively small capacity. Its function is to provide temporary storage of factors to be operated on by the arithmetic and logic unit (ALU) 8.

The circuits which decode the output of C register 6*a* interpret the control word bits and condition the gates, lines, and data paths that determine the operation of the central processing unit (CPU) for that particular control word.

Local storage unit 7 also acts as a buffer for the operation of certain types of input/output devices indicated generally as 9. Addressing of local storage unit 7 is accomplished by means of local storage addressing unit 10. Local storage addresses are generally made up of the outputs of the C register 6*a* contained in control element 6 combined with the outputs of the Mode or MMSK register. These registers will be explained later but it may be stated at this point that they serve to indicate generally the nature of the macroprogram being processed. Data read from local storage unit 7, together with data from the input/output (I/O) devices 9, is fed to A and B register assembler 11. The function of A and B register assembler 11 is to collect and prepare data for entry into the A and B registers 4. These registers serve as the input registers to ALU 8 as well as providing an input to main storage data assembler 2. ALU 8 contains the circuits which perform the arithmetic and logic data manipulations under the control of C register 6*a*.

Certain busses are significant to the operation of the system. The Z bus carries the output of ALU 8 to local storage data assembler 5. Data from main storage unit 1 is transferred to control unit 6 or local storage data assembler 5 over the storage data bus out (SDBO). The bus between local storage data assembler 5 and local storage unit 7 is local storage data bus in (LSDBI). Local storage data bus out (LSDBO) conveys data from local storage unit 7 to A and B register assembler 11. External bus out (EBO) represents a branch of the LSDBI and conveys data from local storage data assembler 5 to I/O devices 9. External bus in (EBI) is an input to A and B register assembler 11.

Our invention relates to improvements in the organization and operation of computing systems utilizing either microprogramming or local storage. Certain aspects of the invention are related to improved means for accomplishing data processing operations by means of microprogramming and other aspects are mover concerned with the use of a high speed, relatively small, local storage unit. The embodiment we have chosen for the purpose of illustrating our invention is a microprogrammed computing system. This system, shown generally in FIG. 1, operates on a macroprogram contained in the main storage unit 1. Macroinstructions comprising a part of the main program are read from main storage unit 1. Each macroinstruction in the repertoire of the system refers to a series of microinstructions. Thus, a macroinstruction read from storage unit 1 provides an address for the first microinstruction of the associated series of microinstructions. Each microinstruction is read from storage unit 1 and placed in C register 6*a* of control unit 6. When the particular operations associated with the microinstruction have been completed, the next microinstruction is read from storage unit 1. When the series of microinstructions associated with the macroinstruction has been completed, the system operates to read out the next macroinstruction.

Local storage unit 7 is used to keep track of the data and addresses required for the various operations performed by the system. Depending on the particular mode of operation which is current in the system, a particular portion of local storage unit 7 may be used. For example, routine data manipulations within the central processing unit involve one zone of local storage unit 7. Individual input/output devices may each have their own zone. Interrupt routines may be a further class of operation to have an assigned zone.

Figure 2:
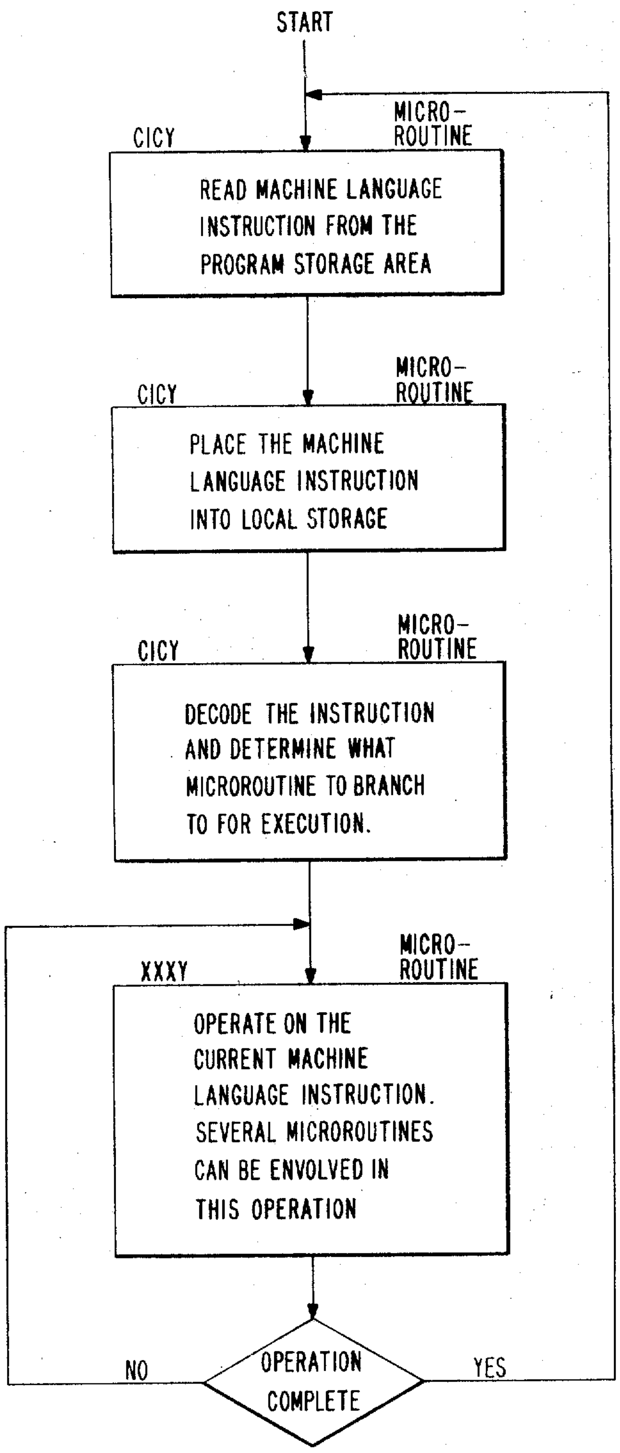
FIG. 2 is a data flow chart illustrating the relationship of machine language (macro-) instructions to the microinstructions used for control of the system.

The execution of a single macroinstruction proceeds as shown in FIG. 2. The first step in the operation is to read the machine language instruction (macroinstruction) from the program storage area in main storage 1. This is done by means of an instruction cycle microroutine (CICY) which is wired into the system. The machine language instruction is then placed in local storage 7. The instruction cycle microroutine decodes the instruction to determine the starting point for the microroutine associated with the machine language instruction. The addressing circuits 3 for main storage unit 1 are then supplied with the address of the first microinstruction of the routine and a branch is made to that location. The sequential execution of microinstructions continues until all the microinstructions associated with the particular machine language instruction have been completed. When the last microinstruction has been completed, the instruction cycle microroutine reads the next machine language instruction from storage unit 1. This action continues until all machine language instructions have been executed and the macroprogram is completed.

Figures 3, 3A:
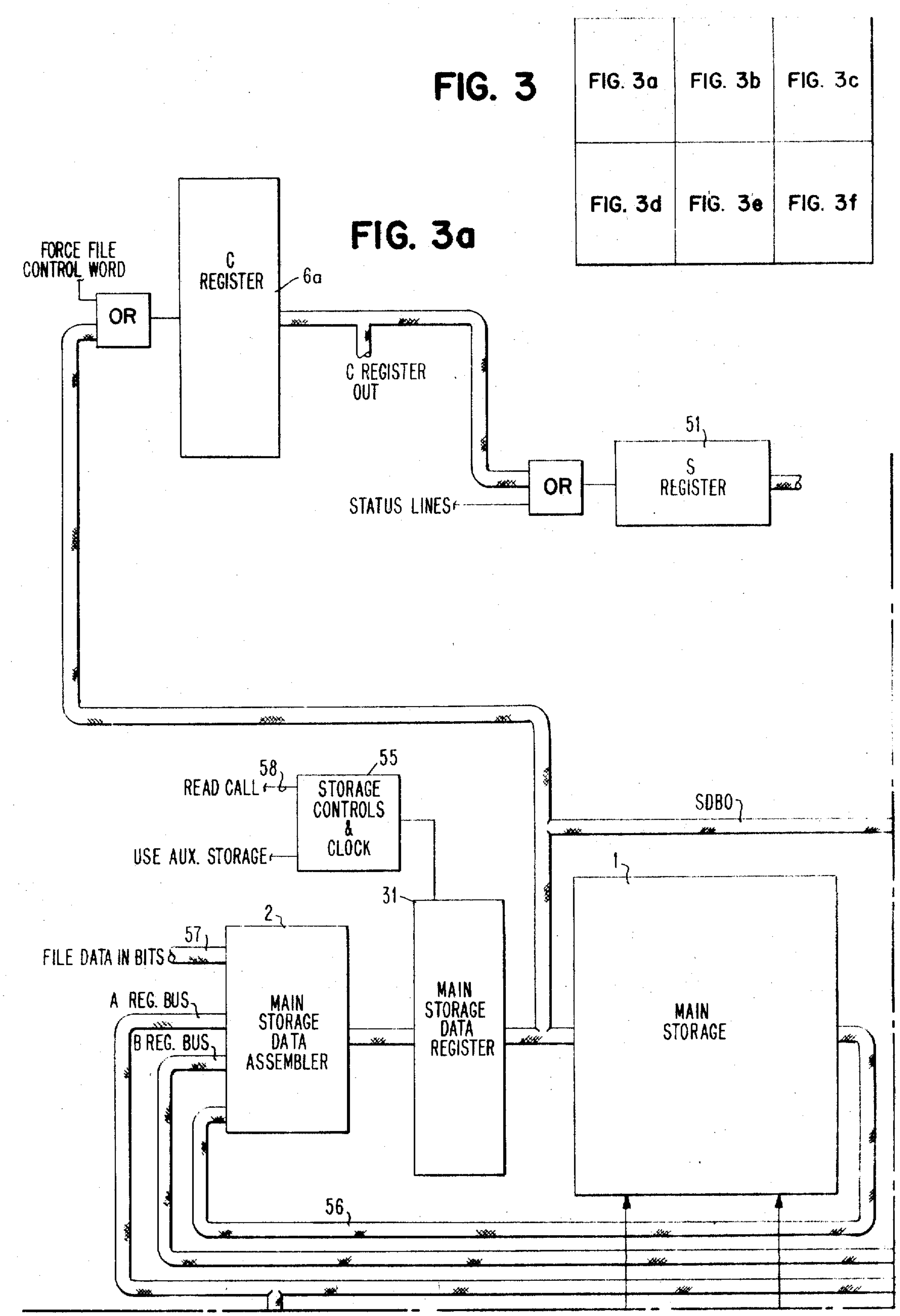
FIGS. 3*a*—3*f* constitute a composite drawing of a data processing system embodying the invention.
Figure 3B:
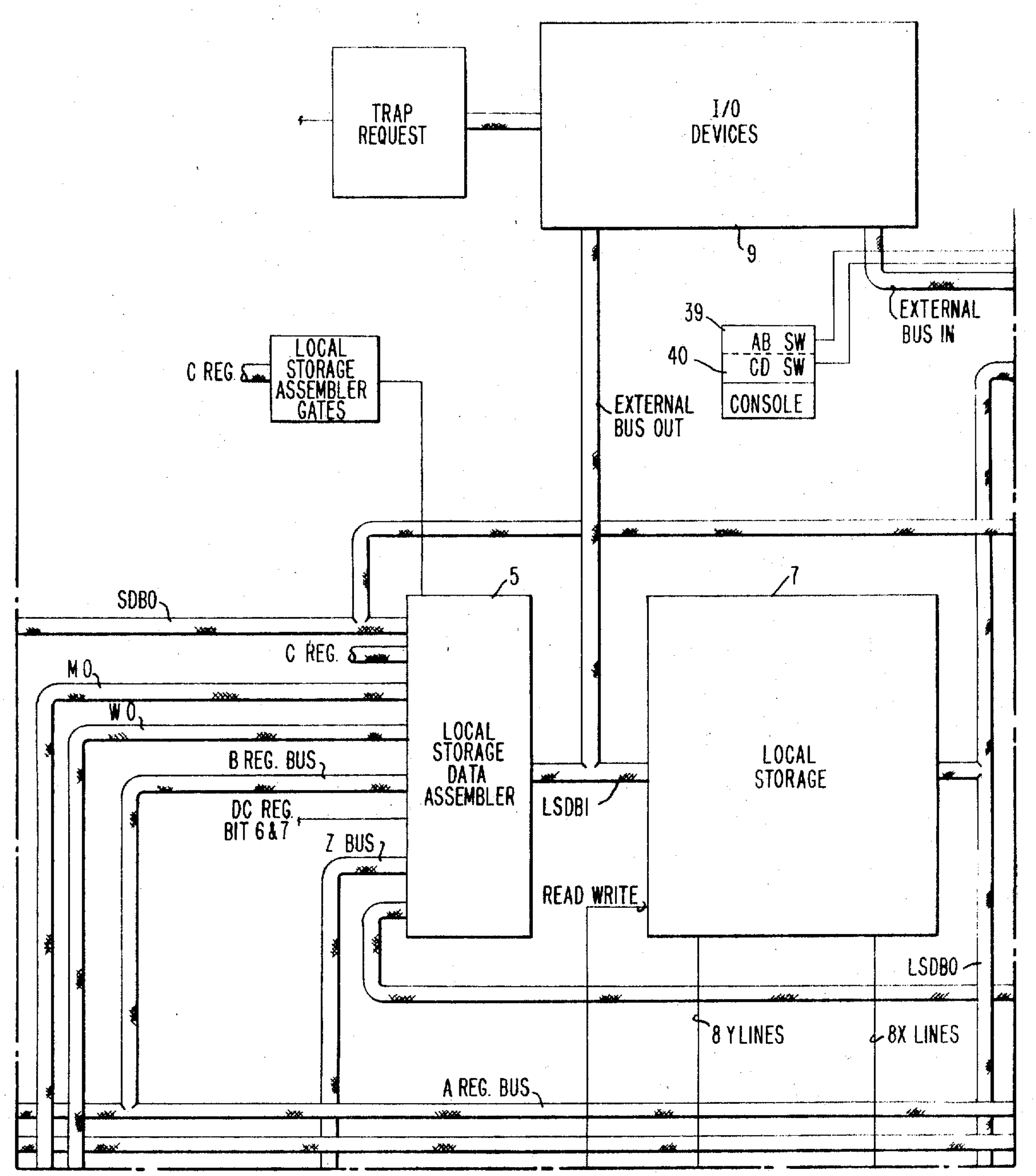
Figure 3C:
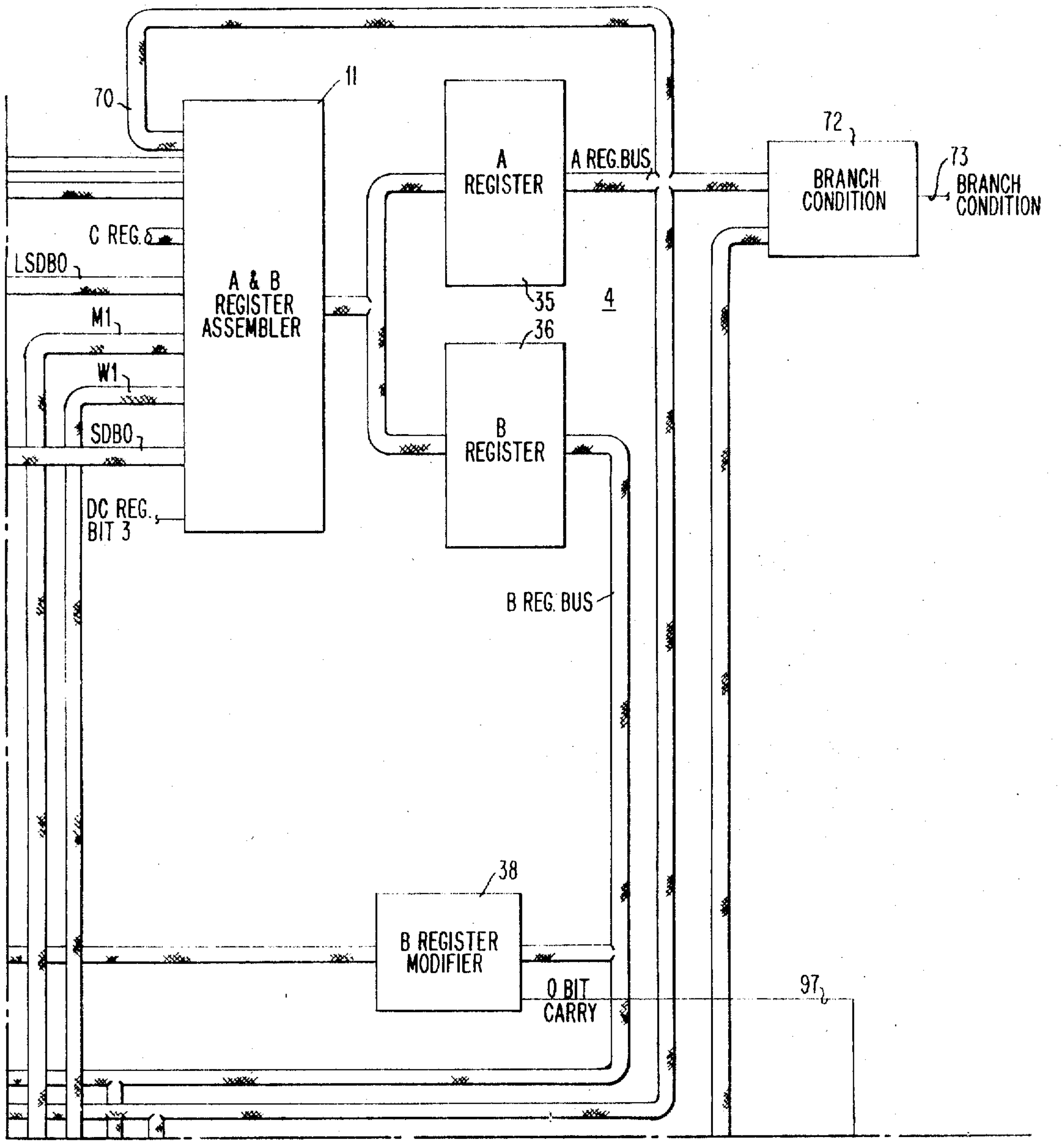
Figure 3D:
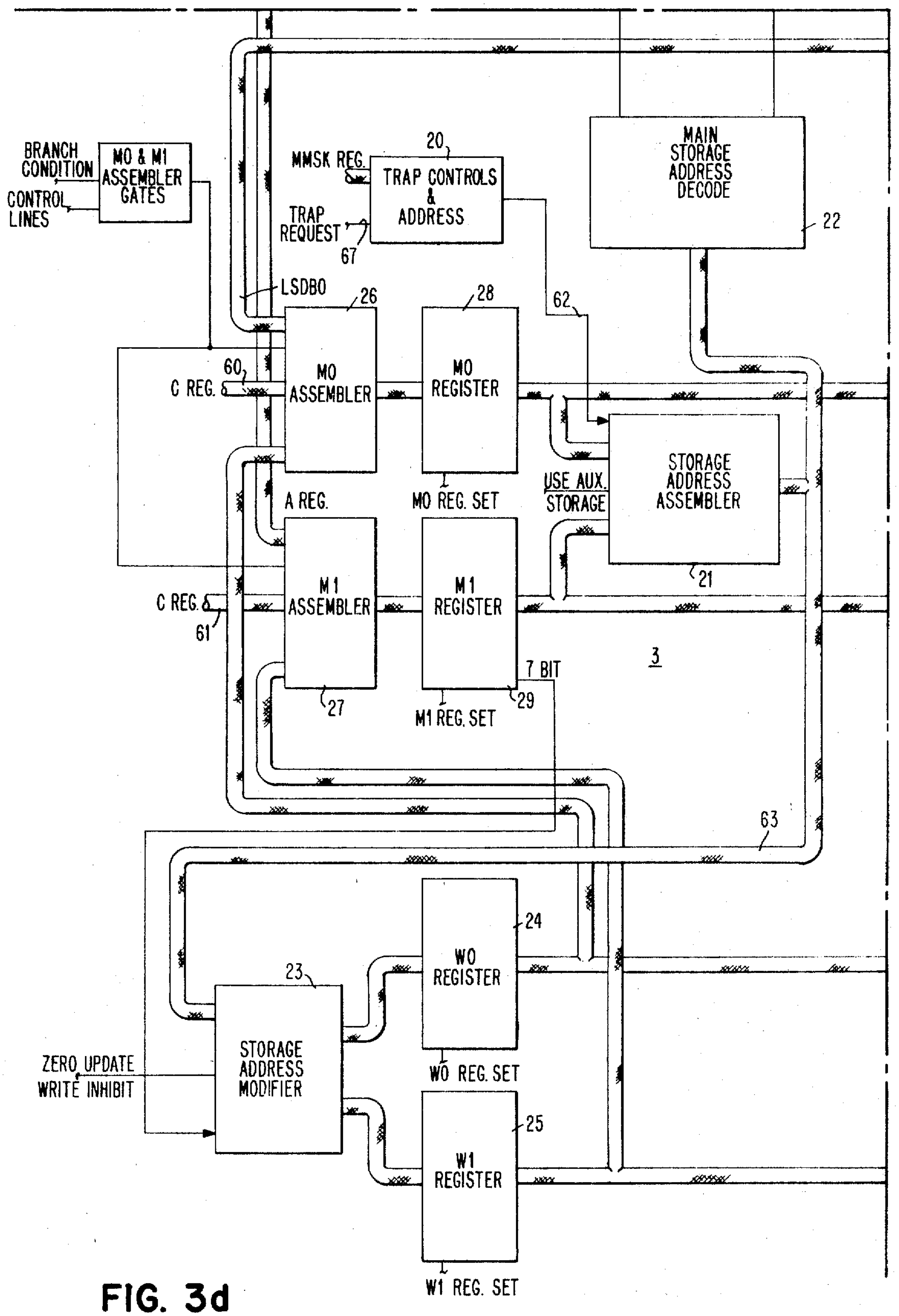

FIGS. 3*a* through 3*f* represent a detailed presentation of the system shown generally in FIG. 1. Where possible, similar reference characters have been used to designate the same portions of the system. Main storage address assembler 3 is shown in FIG. 3*d*. Local storage addressing unit 10 is detailed in FIG. 3*e*. Arithmetic and logic unit 8 is presented in FIG. 3*f*.

INITIAL LOADING OF CONTROL STORAGE

Microprogram control information is loaded into an area of main storage unit 1 set aside for control information. The program load is initiated by the Initial Control Program Load (ICPL) switch on a control console. This switch sets a latch which generates a trap request signal to trap control 20. This control generates a main storage unit address related to the trap request signal. The trap request signal develops an address in trap control 20. The address is forced into main storage address assembler 21 and presented to main storage address decode unit 22. In this case a tap is taken to the main storage unit 1 address 0010 which is a portion of the actual control storage address. The high order bits are forced to a pattern dependent upon the memory size.

The first word of the trap routine is an MMSK control word. Its main function is to set a 1 in bit 8 of MMSK register 91. One function of the MMSK register is to control priority of trap requests. Bit 8 is a very high priority bit. It inhibits all further trap requests. This bit is further operative to stop the clock should a CPU error be detected since there are no error control programs resident in storage at this time. Once the first address has been stored and the contents of main storage location 0010 read out, the trap address that was presented to main storage unit 1 is passed through main storage address modifier 23 where it is incremented by 2 and latched in WO register 24 and W1 register 25. The address is incremented by 2 in order to access the next sequential address, in this case 0012. Once the setting of the MMSK bit 8 is complete, the next address from WO—W1 registers 24 and 25 is set through MO—M1 assemblers 26 and 27 to M0—M1 registers 28 and 29. This address represents the next sequential instruction and is therefore used to fetch the next instruction from main storage unit 1. This pattern of incrementing and read out of storage unit 1 continues as long as the words read out are not branch words.

Assuming that the initial control program load is to be made from a deck of cards, the data on the first card or cards, representing boot strap information, is read into the address immediately following the manually loaded portion of control storage required to start the ICPL routine. Subsequent cards, that is the cards containing the control information for the rest of control storage, are self-describing. That is, the first portion of the card contains the main storage address at which the information on this card is to be stored. Each card may contain a number of control words. These are sequential control words. The ICPL program interrogates the first few columns of the card, finds out what address is to be loaded and sets up an address register in local storage unit 7. The ICPL program then reads in the data off the card and loads the data from the card beginning at the main storage address specified by the card. The output signals from the card reader are initially loaded into a buffer-type location of main storage unit 1.

Once the entire 80 columns of the card have been stored in the buffer location, the microprogram interrogates the first six locations of that card. If the first four columns of the card contain the address of storage to be loaded, that address is read out the buffer location and placed into a first selected register in local storage unit 7. Provided the card is not a special card such as an end card, used at the end of a deck, the microprogram completes the loading of control storage in the following manner. The given control word is read from the buffer in main storage unit 1 and placed in a register located in local storage unit 7.

The microprogram would then hang up in a loop which uses the first selected local storage address register to access the main storage unit 1 and store the value contained in a second local storage register. The control word in C register 6a specifies the first local storage register as the address register and the second local storage register as the data register. A store cycle would be run and the storage address in the first register would be incremented by 2. In other words, once this control word is placed in control register 6a, local storage would be accessed for the address in the first register. This value is sent over Local Storage Data Bus Out (LSDBO) through MO—MI assemblers 26 and 27 into MO—MI registers 28 and 29. A store cycle would be taken for this address in main storage unit 1. The value in the second local storage register would be supplied to A—B register data assembler 11 and loaded into A and B registers 35 and 36 from which it would be supplied to main storage. When the transfer of the value in the second local storage register into main storage is complete, the first local storage register would be read out into A and B registers 35 and 36. From there, the value would be fed through Arithmetic and Logic Unit (ALU) 41 and B register modifier 38 to increment the value contained in the first local storage register and then stored back in local storage unit 7. This completes the operation of storing a control word in the address specified by the first local storage register and updating the address by 2 without going to the next sequential control word. The microprogram then reads out the next control word buffered from the card and repeats this procedure for as many control words as appear on the card.

The card reading operation of ICPL is not done by the mechanism normally used during other I/O operations. Since there are no other I/O devices in operation at this time, the operation is simply initiated and allowed to stay in a tight loop for as long as the data is being transmitted from the card reader. Once ICPL routine has been entered, the microprogram reads in the switches from the console (A—B switch 39 and C—D switch 40) through A B register data assembler 11 into A—B registers 35 and 36. The output of A—B registers 35 and 36 is gated through the ALU 41 into a local storage register. This is done by a specific control word, a move word. Once the data represented by switches 39 and 40 has been placed in local storage unit 7, a brief decode is done on the A—B switches 39 and a branch is taken to the appropriate microprogram routine to handle the indicated I/O device. There is a unique routine for each of the I/O devices 9. Only that routine used with the ICPL would have to be hand loaded for a given initial control program load. Assuming that the channel is used for ICPL, an 02 is entered in the A—B switches 39. This indicates an ICPL from the channel input device. CD switches 40 are set to indicate the address of the channel input device, in this case the card reader. Since the channel is identified as the I/O device, a control word is issued from the trap address. This control word specifies that Mode register 44 is set to K where K is a field in the control word. In this case, the K field contains a value of 38. This sets the 2, 3, 4, 5, 6 and 7 bits in Mode Register 44 to 111000. This bit pattern indicates operation in channel mode using local storage 7 zone 0. The actual reading of a card, for example, for a card reader on the channel can now be initiated. This is done by stepping through an initial selection on the channel.

To begin the initial selection, the value that was initially in the CD console switches 40, now resident in a local storage register, is moved to the channel bus out register. This is a particular register in the local storage zone 0. This transfer is accomplished by an external move control word in C register 6a which operates to take the local storage register, place it into A register 35 and gate it straight through ALU 41 onto the Z bus to local storage data assembler 5 where it is now available on the local storage data bus in (LSDBI). Because this is an external move, the data is placed on the external bus out (EBO) to the channel, which is one of the I/O devices 9. The mode register bits 2, 3 and 4, setting at 111, indicate channel mode and gates the external bus out to the channel bus out register, contained as part of I/O devices 9, as opposed to some other register that might be signified by the same decode within the control word.

With the address of the device to be addressed loaded in the channel bus out register, the interface sequence to address that particular device can be initiated. Control word type 0's are used in C register 6a to raise different interface tags for the channel device. Two consecutive control words would raise address out and select out signals on the channel. Then the microprogram would go into a loop waiting for response from the I/O unit. A valid response would be the operation in (OP IN) tag coming up. Assuming that OP IN does come up, the microprogram would then generate a control word resetting the address out tag and go into a loop waiting for the address in tag to come up on the channel interface. Once the address in tag was up it would be assumed that the correct I/O device has responded to the initial selection polling.

With the address in tap in the up condition, another move external is done from a local storage register to the channel bus out register. But now a specific value of 02 is set into the bus out register, corresponding to a read command to the devices on the channel. Once the 02 or read command has been set in the channel bus out register, the command out tag is raised in the channel by the appropriate word type 0 control words.

The microprogram loop then waits for the status in response from the device. When this is received, the microprogram checks the channel bus in via an external CPU move. This is a control word function, to ensure that the status response is 0 and that this is the indication that the I/O device has accepted the read command and will begin to read the card. The microprogram responds to the I/O device on the channel by raising the service out tap indicating that the I/O device should proceed with the read command. The microprogram will enter a loop, branching on service in, which is the tag from the channel device indicating that data is present on the channel bus in. Once this indication is received, the microprogram moves the data into local storage unit 7 by means of an external CPU move, responds with service out and again goes into the service in loop.

The microprogram remains in this sequence until it gets an ending status; that is, after 80 columns of the card have been read in. The first card in the case of the channel is the boot strap card so it is handled a little differently from the subsequent card. The first card is read directly into the control storage area of main storage unit 1 beginning at an address late in the ICPL routine itself. The initial input portion of the manually loaded portion of the ICPL routine contains just enough to read in the first card. The portion that is loaded from the first card follows this microprogram and it contains the additional microprogram information necessary to handle the ending status of the first card and the subsequent transfers of control program data from the input device. This additional information would handle the loading of a subsequent card directly into buffer storage of main storage unit 1. It also contains the microprogram that interrogates the first few columns of the card to find the area to be loaded and the loop that actually does the loading.

This operation continues until the last card has been reached. The last card contains a special code in the first few columns of the card indicating that it is an end card as opposed to an actual data card. Upon completion of this card, the program normally branches into one of the microprograms that has been loaded by the core load. This microprogram in most cases is the system reset microprogram which enters a "-waiting" or soft stop loop once it has done some manipulation to ensure that certain registers are in known state.

DESCRIPTION OF THE CONTROL WORDS USED IN THE C REGISTER

C register 6a is used to hold the output of main storage 1 when that output of main storage is a control word as opposed to data that is being transferred to local storage unit 7. These control words effect the gating and operation of controls that determine the functioning of the system. In general, bits 0, 1 and 15 of the control word describe the particular word type. The three bits therefore provide a maximum of eight different types of control words.

Word type Zero is called the set/reset word. It is used to control different fixed registers in the CPU and I/O attachments. Bit 2 is used as the set/reset bit. If bit 2 is a 0, a reset function is performed. A set function is indicated by a 1 in the bit 2 position. Bits 4, 5, 6 and 7, designated the set/reset source, select one of 16 registers as the source register. Bits 2, 3 and 4 of Mode register 44 are used to expand the decoding possibilities to 128 registers. Many of these are independent of mode; for example, a 0000 combination in the set/reset source field of 4, 5, 6 and 7 selects the S register. This selection is independent of the bits present in Mode register 44. Other possibilities are dependent on the Mode register. That is, a given decode may refer to one register as the source in the channel mode and to another register as the source when in another mode, etc.

The remaining bits in the word, that is bits 3, 8, 9, 10, 11, 12, 13 and 14 represent the value to which the specified register will be set. These are used in two ways. One is where each bit selects a given bit within the register. The word can either set from 1 to 8 bits on, or reset from 1 to 8 bits. Set and reset combinations cannot be mixed in a single control word. This control word can also be used in a second manner as a replacement register. In this case the bits 3, 8, 9, 10, 11, 12, 13 and 14 are moved directly to the specified register to fully replace the value in the specified register. The choice of the form of the set/reset control word is dependent on the application of the register being controlled. In general, the most often used form is the case where selected bits within a register are turned on or off. The exception is the MMSK control word version of the set/reset word type. To obtain more function from this word, the bit patterns have a slightly different meaning. Bits 0, 1 and 15 define it as a word type Zero. The set/reset bit is used in conjunction with bit 11 to describe the function to be performed. The combinations specified by these two bits are; set an MMSK bit only, set an MMSK bit and store a backup register, reset an MMSK bit only, and reset an MMSK bit and restore a backup register. In this particular word, bits 3, 12, 13 and 14 are decoded to select an MMSK bit; that is, depending on the bit combination, a certain MMSK bit will be set or reset. This provides a maximum capability of 16 bits. In the K low field (bits 8, 9, 10, 11), bits 8, 9 and 10 are significant only when the combination in bits 2 and 11 specifies either storing a backup or restoring a backup register. In that case, bits 8, 9 and 10 specify the address in zone 4 of local storage unit 7 where the backup register will be stored or the register will be used as a source for restoring a backup.

The next control word is work type One, which is the arithmetic constant word. In this word type the function decode field, bits 2, 3, 12, 13 and 14, describe the function of ALU 41. For example, whether or not the results of an ALU operation are to be stored in local storage unit 7 and what gating is desired at the input to the ALU. The AS field, bits 4, 5, 6 and 7, selects one of 16 registers in local storage unit 7 within presently selected zone. (In some zones only eight registers are available.) The K value, bits 8, 9, 10 and 11, is used for supplying a constant value as one of the inputs to ALU 41. This is accomplished by loading bits 8, 9, 10 and 11 into the B register 36 high and low to give a constant mask.

For example, a decode of bits 2, 3, 12, 13 and 14 equal to all zeros specifies a $Z=A+K$ low function. K low indicates that only half of the constant is to be used. The Z indicates that the result will not be stored in local storage; that is, it will be done just for testing purposes. The A refers to the value specified in the AS field; that is, the register that will be used as one of the sources. The + indicates that a plus operation will be done by ALU 41. K low means that the value presented as the B input to the ALU will be a OK where K happens to be the pattern in bits 8, 9, 10 and 11 of the control word. In the same example, assume that the constant in bits 8, 9, 10 and 11 is equal to the hexadecimal value of 3. This is set in both B high and B low so that the B register contains the value 33. The K low indicates it is not desired to add 33 to the local storage register indicted in AS field—only to add 3 to the low portion. The K low signifies that the B input into the ALU will only be the low portion and the higher portion will be zeroed out. That is an 03 (OK) will be added to the A source field.

The next control word is a word type Seven, the branch on condition word. This may also be a word type Six, the difference being in bit 15. If bit 15 is a 0, branching is successful when the selected bit is 0. If bit 15 is a 1, indicating word type Seven, the branch will be taken if the selected bit is a 1. In this word, the BC field includes bits 2 and 3 which select the bit of a half byte quantity which is to be accessed. Normally the branch would select bits 4, 5, 6 or 7 and decode that particular value. Bit 5, the straight-cross bit, selects either the high or low portion of the byte at the A register output gates and controls 42. Putting it another way, the branching is done on the output of the straight-cross control **42*a* in A register output controls 42 into the ALU. The byte to be branched on is placed in A register 35. Depending on bit 5, the straight-cross bit, the A register low entry into ALU 41** will either be A register bits 4, 5, 6 or 7 or bits 0, 1, 2 or 3.

The AS field, bits 4, 5, 6 and 7, is used to select the quantity to be branched on. Bit 8 determines whether the quantity comes from local storage or from an external source. If bit 8 is a 0, bits 4, 5, 6 and 7 represent a local storage address. If bit 8 is a 1, it represents an external quantity. The straight-cross bit is actually one of the AS fields. Therefore, only decodes which have bit 5 equal to a 1 may be branched on. Even though the AS field is a 4-bit quantity, bit 5 is always forced to a 1 when addressing externals or local storage. The original value of bit 5 is sent only to straight-cross controls **42*a*. The rest of the bits in the type Seven word, bits 9, 10, 11, 12, 13 and 14, are used as replacement bits into M1 register 29 should the branch be taken. For example, if a branch is to be taken when bit 5 of a given register is a 1, and if bit 5 of that register is a 1, bits 9 through 14 will be gated into the M1 register. The rest of the bits will remain the same as they normally would; that is, they would be gated directly from WO W1 registers 24 and 25. The replacement bits are fed into bits 1, 2, 3, 4, 5 and 6 of M1 register 29**.

Word type Five is the branch on mask word. This provides a 4, 8 or 16-way branching capability on a particular digit. The gating is much the same as in word type Seven, the branch on condition word. That is, the A source field selects a given local storage quantity or external quantity depending on the condition of bit 8. Again bit 5 is always forced a 1 and the actual bit 5 is used in the straight-cross control. That is, the branch can be either made on a high digit or low digit of the selected quantity. Bits 2 and 3 select the type of branch.

Another function of this word is the A source nonzero branch, a bit combination 01 in bits 2 and 3. A branch is performed if the value in the A register is nonzero; that is the selected value either from local storage or the external is nonzero. Bits 9 through 14 again are replacement bits; however, they are substituted in different locations as compared to the replacement bits in the branch on condition word. The bits they replace in M0 M1 registers 28 and 29 are different. They replace bits 0, 1 and 2 in M1 register 29 and bits 5, 6 and 7 in MO register 28. Again, in the case of the A source nonzero, the bits are replaced only if the branch is made. In the other cases, the replacement is always made. The 4-way branch is made by taking the value resulting after bits 9—14 have replaced bits 0, 1 and 2 in M1 register 29 and bits 5, 6 and 7 in MO register 28. The rest of the bits in M1, that is bit positions 3, 4, 5 and 6, are the result of AND'ing a quantity with the high digit or low digit as selected by the word. For example, assume it is desired to make a 4-way branch on register D1 in local storage unit 7, that is decode 0111, and to branch on the high portion, that is do a 4-way branch on bits 2 and 3 of register D. Register D is set into A register 35. The straight-cross bit is on, indicating that the bits 4, 5, 6 and 7 will be crossed into ALU 41 to correspond to bits 0, 1, 2 and 3. Because it is desired to do a 4-way branch, these bits are AND'ed with an 0011 mask which gives a 4-way branch on bits 2 and 3. The result of this mask serves as the replacement for MO register 28, bits 3, 4, 5 and 6.

Control word type Four is the unconditional branch word. With this word, all bits except bits 0, 1 and 15 are used as replacement bits to the M0 M1 registers 28 and 29. Every time a word type Four is executed, providing the system is not in an I/O trap, as would be signified by any MMSK bit 0 through 6 being in a 1 state, a backup register is stored in the I0 and I1 register locations of zone 4 in local storage unit 7. This is done to provide a branch and link function. The address to be stored is the next sequential address after the branch. The branch is changing the address to some different value, but it may be desired to retain the address of the next sequential word in the event that the branched to subroutine will be followed by a branch back to the source microprogram.

At T1 time, M0 register 28 is gated through the local storage data assembler 5 into the IO register location in zone 4 of local storage unit 7. At the same time, M1 register 29 is set into A register 35 through the A B register data assembler 11. The value in A register 35 is then forced through the ALU with an update of 2; that is, B register 36 is set to a 01 and the carry insert line 46 is brought up. The value on the Z bus, representing the output of the ALU, is then equal to A+2. The net result is that M1 register 29 has been incremented by 2. At T6 time the Z bus, or output of ALU 41, is gated through local storage data assembler 5, over the LSDBI bus into local storage register I1 in zone 4. Since only the M1 portion of the address is being updated, the MAS, Microprogram Assembly Routine, guarantees that whenever a branch is intended to be a branch and link function, this address will never be assigned to a storage location boundary such that a carry from M1 to M0 might be expected when the update is done. This is signified on coding by a different notation. A BR microinstruction indicates just the direct branch. A BAL instruction indicates a direct branch but with the additional connotation that this is a BAL instruction and will eventually be returned to, so that the MAS program will not assign this on an improper address. The return function is actually executed or performed by the MMSK control word.

With regard to the direct branch, when it is used as a BAL, that is to a subroutie which returns to the original microprogram, the return function is performed by the execution of an MMSK word. The MMSK word specifies that a return be made and an MMSK bit be turned off, and MMSK bit that does not exist.

The next control word is word type Three the move arithmetic word. Its format is very similar to the constant word, that is word type One. The only different is that bits 8, 9, 10 and 11, instead of being a constant value, are really an address and are referred to as the B source field. Bits 2, 3, 12, 13 and 14 again described the function to be performed. This control word operates to perform logical and arithmetic functions which do not involve K values. An example of a function is bit value 10, described as $A=A\veebar B$.The A source field, that is bits 4, 5, 6 and 7, is used to address local storage unit 7 with the quantity being placed in A register 35. The B source field, bits 8, 9, 10 and 11, is used to access local storage unit 7 and the results are placed in B register 36. Both registers are gated straight into the ALU through A register controls 42 and B register controls 43. An exclusive OR function is performed within the ALU and the output of the Z bus is stored again in the A source field specified by bits 4, 5, 6 and 7.

The next control word is word type Two. This is the storage word. It is used to access storage under microprogram control. The field which includes bits 2 and 3, taken in combination with bit 11, defines the type of operation and the section of storage to be accessed. Bits 2 and 3 are decoded as read control storage, read auxiliary storage, store control storage and store auxiliary storage. If auxiliary storage is indicated in bits 2 and 3 and bit 11 is a 1, it signifies that main storage is to be accessed either for reading out data or for storing data. The A source field, bits 4, 5, 6 and 7, specifies the register in local storage unit 7 or external register to be used for data either for storing data into main storage or to accept data from main storage.

Bit 7 is the byte select bit. When set to a value of 1, it selects a single byte as opposed to a normal half word. The B source field, bits 8, 9, and 10 (bit 11 in this field is used to designate main storage 1 as indicated previously), is used to indicate the register in local storage unit 7 to be used as an address register for main storage unit 1. The MC field, bits 12, 13 and 14, describes the type of operation. Two types of operations, store local storage plus and store local storage minus, indicate that the A source field is a register in local storage unit 7 and the plus and minus indicate whether the contents of the address register is to be incremented or decremented by one or two dependent on the condition of the byte select bit 7. That is, if bit 7 is off, a half word is involved so the increment/decrement is 2. If bit 7 is a 1, a byte is being used and the increment or decrement is a 1.

Store external plus and store external minus are two other functions of this word and indicate that the data is to be stored from or stored in an external quantity and the increment or decrement is always one. That is because the external facility is only for one byte. The byte select must always be on; that is bit 7 must always be a 1.

Another decode of the MC field, again bits 12, 13 and 14, provides that no update is performed on the address that is used. Still another version of this word allows bits 8, 9, 10 and 11, normally used as the address of the local storage register containing the address to be accessed in storage, to be used instead as a constant value and placed directly in bit positions in the M1 data assembler 27.

DESCRIPTION OF FIGS. 3*a*—3*f*

The C register 6*a* is the location where the control words are placed to effect control of the system. They are placed in C register 6*a* from main storage unit 1. The S register is the CPU status register. It is a hardware register that can be reset by the word type Zero to a known value, for example all 0's. Some bits can also be set by the word type Zero to enable these hardware bits to be used as status indicators. For example, the S6 bit is used to indicate whether an execute instruction was executed. The S7 bit happens to be the channel 0 interrupt bit. The S1 bit is used in conjunction with ALU 41 to provide a true-complement signal through B register control 43. A plus or minus operation is performed in ALU 41 depending on the condition of the S1 bit.

The status line inputs to S register 51 are dynamic conditions that are sampled into S register 51 through the dynamic condition register controls 52 and dynamic condition register 53 when certain words are executed. For example, the S2 bit is the answer nonzero bit. For certain arithmetic functions, this bit will be set to a 1 every time the Z bus is nonzero. The S4 bit is used to indicate invalid decimal digits. When a decimal operation is done in ALU 41 and the A and B register contains an invalid decimal digit, the S4 bit will be set to a 1.

The normal source for the control register is the control words of main storage. However, during disk cycle stealing operations, where the time cannot be spent to access main storage for the control words to govern the data transfer, two control words are forced directly into control register 6*a* to provide the two required operations.

The basic CPU clock cycle is developed in storage control and clock 55 is 90 nanoseconds long. These signals are developed from 10 180 nanosecond pulses which overlap each other by 90 nanoseconds. The logical AND of any two of these pulses produces a 90 nanosecond pulse or P pulse. The 180 nanosecond pulses are T pulses. To initiate a main storage access, an address for main storage and a read-call signal are required. The main storage address assembler 21, which provides the address to main storage, is good from one T4 time to the next.

At T5 time of the cycle a read-call is given to main storage. This is the signal to main storage unit 1 to start accessing main storage with the address which has been supplied by main storage address assembler 21. The use auxiliary storage line is an additional address bit to main storage. Normally 15 address bits are required. The use auxiliary storage bit signifies the use of the "bump," or auxiliary storage, section of main storage as opposed to the normal section of main storage. The main storage data register 31 accepts data from main storage data assembler 2. Data is supplied to main storage data assembler 2 directly from main storage 1 over bus 56 during a read operation and when the information is to be regenerated.

Data is also supplied to main storage data assembler 2 from A register 35 and B register 36 when new information is being placed in main storage unit 1. Another entry is file data in bus 57. This is used during a disk cycle steal operation.

FIG. 3*d* shows the addressing path for main storage unit 1. It consists chiefly of the MO M1 registers 28 and 29, the MO M1 register assemblers 26 and 27, a two byte storage address modifier 23, WO register 24 and W1 register 25. Under normal sequential execution of microinstructions, MO register 28 and M1 register 29 are set at T4 time with an address through MO assembler 26 and M1 assembler 27. A read-call signal on line 58 is issued to main storage at T5 time. The data from main storage unit 1 becomes valid in storage data register 31 at TO time and is set into C register 6*a* as the new control word. Also at TO time the output of storage address assembler 21 is set through storage address modifier 23 and stored in WO register 24 and W1 register 25. Should the control instruction being executed be other than one requiring any type of branch, MO and M1 registers 28 and 29 are again set to the value of WO and W1 registers 24 and 25 at T4 time and a read-call signal issued at T5 time.

This is the normal path for updating control storage addresses and executing sequential microinstructions. Should a direct branch be executed, the value in MO and M1 registers 28 and 29 would be completely replaced by bits from C register 6*a* through the MO and M1 assemblers 26 and 27. For a branch on mask or a branch on condition, where the branch is actually taken, a portion of the input to MO M1 assemblers 26 and 27 is supplied on lines 60 and 61 from C register 6*a*. The rest of the address data comes from the WO W1 registers 24 and 25. To provide for higher microprograms, that is microprogram trapping, an auxiliary path 62 is provided into storage address assembler 21. Should a microprogram trap request occur, trap request circuitry 20 degates the MO M1 registers 28 and 29 from the storage address assembler 21 and forces a new bit pattern, peculiar to the particular trap request, into storage address assembler 21. This pattern becomes the next address to main storage and is fed into the update path 63 through storage address modifier 23 to WO W1 register 24 and 25.

Trap controls and address unit 20 will be discussed in greater detail later. It may now be noted that MMSK register 91 controls the priority of the microprogram in process. If a given trap is already in progress, only trap request of higher priority will be allowed to enter trap control 20, Should a higher priority trap occur, the trap request signal line 67 is raised. At T4 time, this signal resets the latch in storage address assembler 21 that is gating MO M1 registers 28 and 29 into the storage address assembler 21 and instead gates a bit pattern associated with the highest priority trap request which is pending. This will be described in more detail later on.

The MO M1 assemblers 26 and 27 are the gates that control the bits gated into the MO M1 registers 28 and 29. Normally, WO and W1 registers 24 and 25 are gated into MO and M1 registers 28 and 29. However, should a branch be executed, the gating must be changed. For a direct branch, this function gates only the control register. For conditional branches WO W1 registers 24 and 25 are gated into certain bit positions but other positions are replaced with bits from C register 6*a*. This gating is performed in MO M1 assemblers 26 and 27.

FIG. 3*b* shows the different paths into local storage unit 7. Local storage data assembler 5 controls the data to be gated either into local storage unit 7 or through the local storage data bus in (LSDBI) to the external bus out. The inputs which may be gated into local storage unit 7 through local storage data assembler 5 include the Z bus, which is the output of ALU 41 for arithmetic operations or most move operations, and the output of B register modifier 38. This is used when performing a double byte update or updating an address that has been used to access storage. The path from B register 36 is solely for display purposes because the local storage data bus in (LSDBI) is one of the display options. This is also the reason for the C register 6*a* input into local storage data assembler 5. The local storage data bus out (LSDBO) is the path used to transfer address data from local storage unit 7 to main storage address assembler 21. The path from WO register 24 exists for display purposes only. The path from MO register 28 is used for storing the backup address, whether it be for storing the high portion of the backup for a direct branch used as a BAL instruction, or in the case of the MMSK control word. The local storage data bus in (LSDBI) becomes the external bus out to the I/0 devices 9. This serves as a serial bus attachment passing from one device to another. Data can be loaded into selected registers in each one of these attachments.

Referring to FIG. 3*c*, the A B register data assembler 11 is used to assemble data for both the A register 35 and B register 36. Bus 70, into AB register data assembler 11 from A register 35, is provided for display only. The external bus in is connected for displaying external quantities as well as a microprogram analysis of these quantities, either moving them directly to local storage unit 7 or branching on them. The bus from C register 6*a* is for display purposes only. The input from local storage data bus out (LSDBO) is provided to allow data to be taken from local storage and placed into either the A register 35 or B register 36. The bus from M1 register 29 is provided for placing the contents of M1 register 29 into A register 35 preparatory to storing a backup address. In the case of a direct branch, the value in A register 35 is incremented by 2 through ALU 41 and stored in local storage unit 7. In the case of the MMSK control word, the value in A register 35 is sent through the ALU 41 into local storage unit 7 with no modification. The bus from W1 register 25 exists for display purposes only. Console switches AB 39 and CD 40 are connected to A B register data assembler 11 to allow the value set by these switches to be placed in local storage unit 7. The storage data bus out (SDBO) is connected to allow display of the low order portion of the value on storage data bus out. Bit 3 of DC register 53 is used in conjunction with the bus from M1 register 29 when the M1 bus is not being used for display purposes.

When a backup is stored for direct branch of the MMSK control word, only 13 address bits are actually stored. Bit 7 position in M1 register 29 contains the dynamic condition register bit 3 which is the adder carry condition. This is placed into A register 35 along with the value in M1 register 29 and placed directly into local storage unit 7 or modified by 2, in the case of a direct branch. The same action is taken during storage of the MO backup. Bits 6 and 7 of dynamic condition register 53 are assembled as bits 0 and 1 along with the rest of MO register 28 when a backup is stored. There are two main display points on the console. Byte 1 is the local storage data bus in and byte 2 of the display is the output of A B register data assembler 11. The switches are used to select the appropriate data for display.

Branch condition control 72 is used to implement branching for control words type Five, Six and Seven. The bus from A register 35 directly to branch condition control 72 is simply a 0 check on A register 35 and is used to bring up branch line 73 when executing an A source nonzero branch function of the branch on mask word.

Branch condition control 72 is also used in conjunction with control word types Five, Six and Seven to select the bit or bits to be branched on. It is set by the A register ALU entry bits 4, 5, 6 and 7, and depending upon the bit configurations in the control word, it selects the bit to be branched on or provides the mask which is to be used in the branch on mask to be executed as a 4, 8 or 16-way branch. If the output 73 indicates a branch should be taken, a signal is given to MO M1 assemblers 26 and 27 and the appropriate gating of the branched to address is performed by MO M1 assemblers 26 and 27.

B register modifier 38 circuitry is used to implement half word moves, half word increments and decrements. Briefly, its function is as follows. The low order byte of the half word to be modified or moved is placed in A register 35. The higher order byte is placed in B register 36. The increment or, in the case of a move, no increment, is forced into the B register entry into ALU 41. In effect B register 36 is degated from ALU 41 and either an increment by 1, 2 or 0 is forced into the ALU through the B register output gates 43 so that the A register becomes incremented by 0, 1 or 2. Depending on the carry out of ALU 41 and the contents of B register 36, the high order byte of the half word is either allowed to stand unaltered or modified by 1.

Figure 3E:
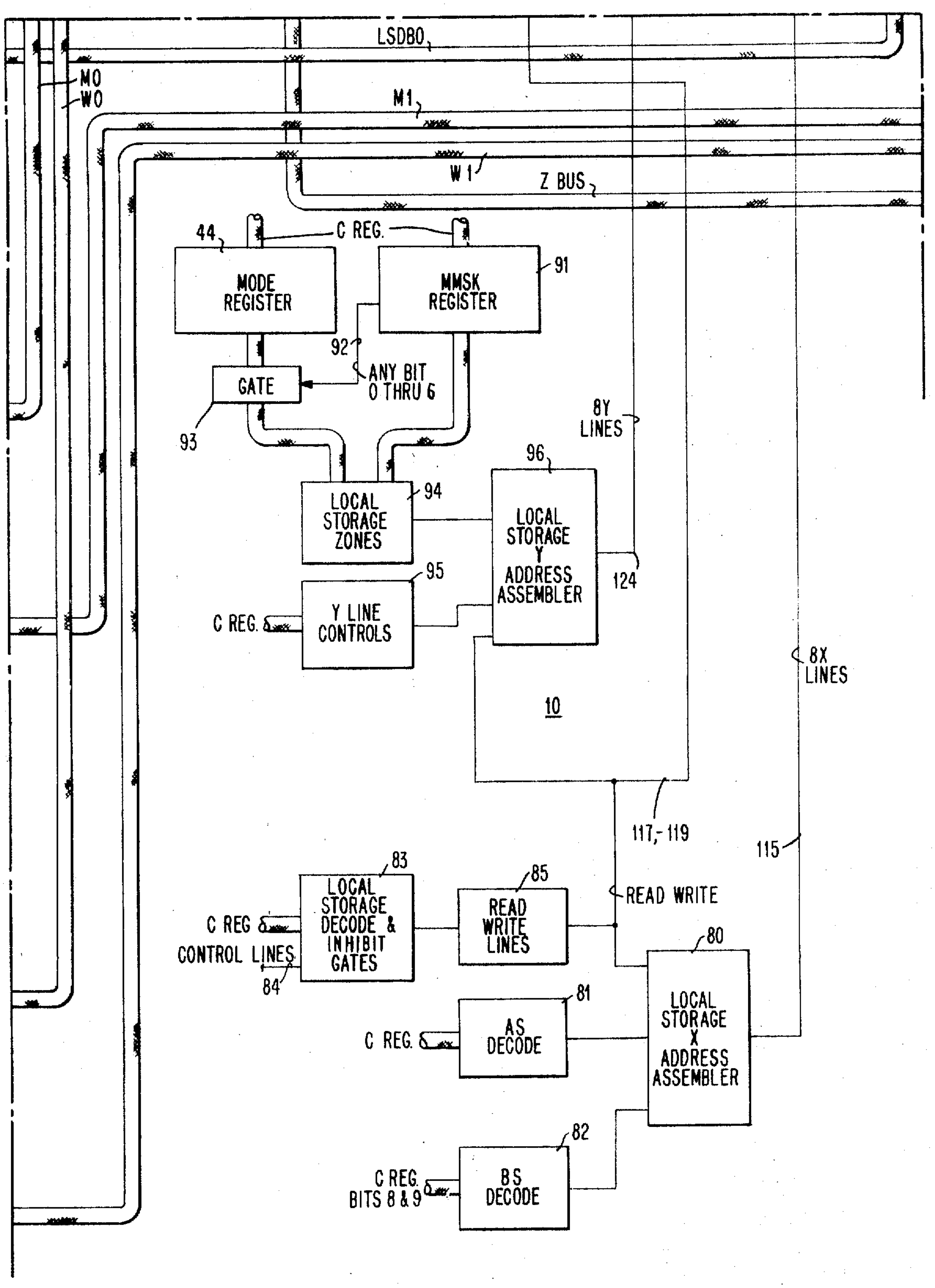

The circuits used in addressing local storage unit 7 are shown in FIG. 3*e*. The interface to local storage unit 7 consists of 16 address lines, divided into eight X lines and eight Y lines, a read line and a write line, together with the nine data in lines and the nine data out lines. For addressing purposes, local storage unit 7 is subdivided into seven sections called zones. Zone 1 is used as an 8-byte zone used for disk file operations. Zone 0 is a 16 -byte zone used for CPU operations. Zone 4 is an 8-byte zone used for backup register storage. Zone 5 is an 8-byte zone used for communication channel operations. Zone 6 is an 8-byte zone used for reader punch operations. Zone 7 is an 8-byte zone used for channel operations.

One common zone between 4, 5, 6 and 7 is used to expand the working areas of each one of those zones. The common zone is addressed whenever the operation is in zones 4, 5, 6 or 7.

The local storage X address assembler 80 generates the signals on the eight X lines. The source field for this assembler is either the AS decode 81 or the BS decode 82 depending on the control word type and time within the machine cycle during which local storage unit 7 is accessed. In general, the source for the X address lines is always the control register, either the AS field or the BS field. The one exception is the direct branch word where a backup is stored in a fixed location is local storage. X address bits 0 and 1 and 1 are forced to accommodate the storing of the backup. Local storage decode and inhibit gates in unit 83 are controlled from timing control lines 84 and C register lines. This unit develops a signal to read-write control unit 85.

The output of local storage Y address assembler 96 represents a decode of the local storage zone being addressed and the high order AS field or BS filed in the control word. The zone address is determined by one of two registers. The mode register 44 of the MMSK register 91. The mode register 44 or the MMSK register 91. The mode register is the basic source of the address bit of the local storage zone. Bits 5, 6 and 7 are decoded to select a given zone. In the event of an I/0 trap, that is any one of MMSK bits 0—6 being on to develop a signal on line 92, the register 44 is degated at gate 93 and the appropriate zone address is forced in local storage zone unit 94 depending on the highest priority bit in MMSK register 91.

In addition the eight Y address lines are controlled by two other control word types. When performing a direct branch or MMSK control word, and a backup register is to be stored or restored, the appropriate Y lines are forced by means of Y line control 95 which responds to the output from C register 6*a* to select the backup section or zone 4. Local storage Y address assembler 96 accepts the inputs from Mode register 44 or MMSK register 91 to develop the eight Y address signals.

As previously described with reference to the X address, the read-write lines in local storage are controlled by C register 6*a* through control unit 83 and are dependent on whether the operation requires reading out of local storage or storing to local storage.

Figure 3F:
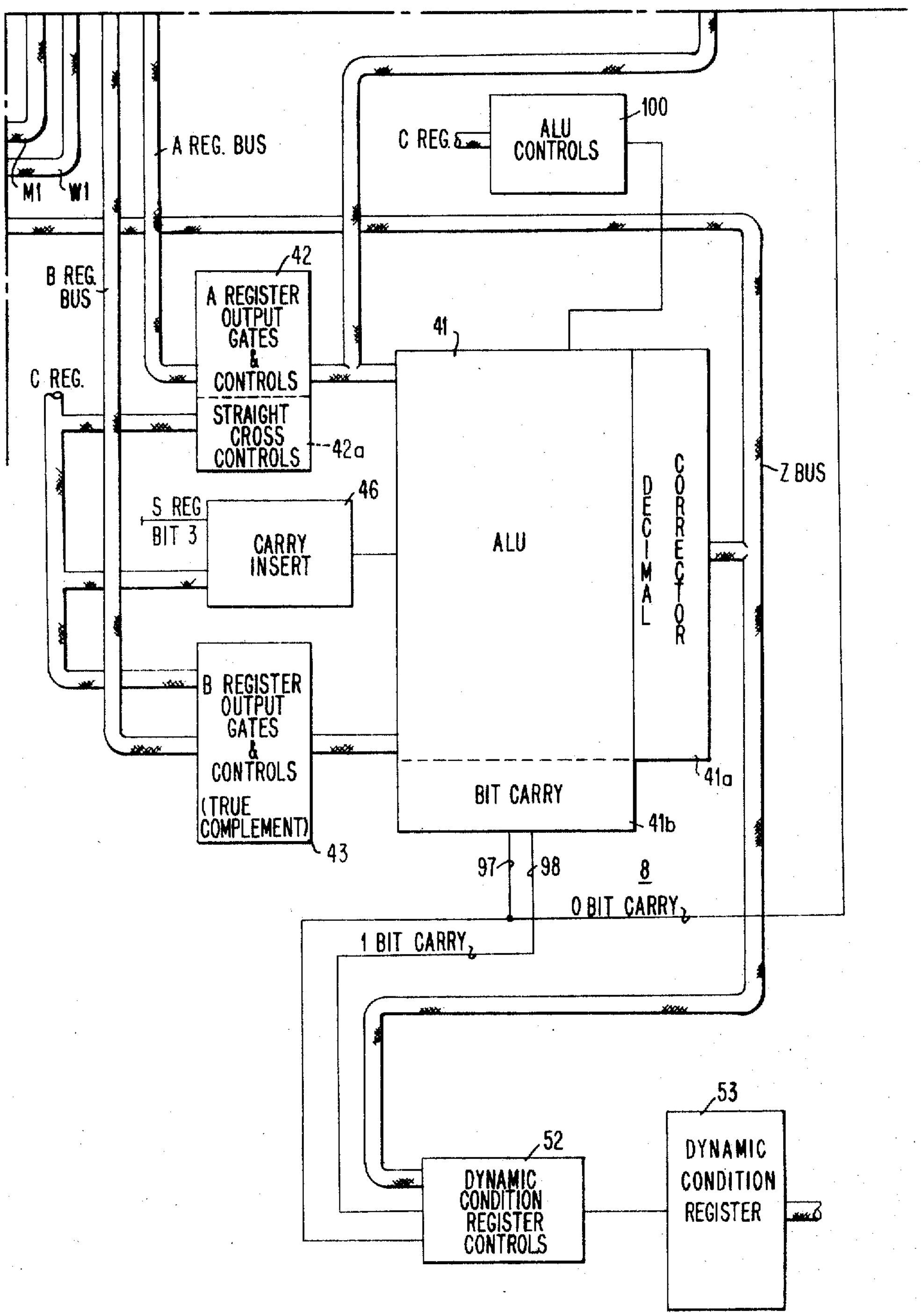

The arithmetic and logic unit 41 is shown in FIG. 3*f*. ALU 41 performs all the arithmetic and logical operations on the two inputs provided through A register output gates 42 and B register output gates 43. It also contains a decimal corrector 41*a* which is used for decimal operation. The ALU controls 100 are a decode from C register 6*a*. Depending upon the word type and bit configurations in the word type, gates are conditioned to perform the desired function through ALU 41. The A register output gate and controls 42 is a set of assemblies and gates from A register 35 and is conditioned by C register 6*a*.

The functions that may be performed in ALU 41 include gating the value in A register 35 through ALU 41 without modification; crossing the A register, that is, if the input sequence to ALU 41 is A high A low, causing the output sequence for ALU 41 to be A low and A high; gating functions applied to high and low; bytes which can be used in parallel with the cross function so that ALU 41 will cross and gate only the high portion, cross and gate only the low portion or simply gate high or low.

The carry insert is essentially the condition of bit 3 in S register 51. It is dependent upon a specific ALU function. That is, when performing strings of add operations or subtract operations where the carry from the previous operation is important, this carry may be retained in bit 3 of S register 51 and called for as an insertion to the ALU on subsequent operations.

The carry insert block 46 is used to insert a carry into the low order position of ALU 41. It may be either the bit 3 of S register 51, when called for by the particular ALU function being specified by C register 6*a*, or it may be an unconditional carry insert again dependent upon the function being called for by C register 6*a*. The B register output gates and controls 43 perform the same function on the output of B register 36 as the A register output gates and controls 42 do for the output of A register 35. The options provided by units 42 and 43 include a gating function high or low, used with the constant words where a constant from C register 6*a* is placed into the B register high and low and, depending on the function called for, either the high-low or high and low is gated directly to ALU 41. The true-complement control is located within unit 43 and, depending on the function to be performed, generates either a straight add or a complement add. In other words, B register 36 is gated into ALU 41 either directly or inverted, depending on the status of the true-complement control.

The output of ALU 41 appears on the Z bus and is gated into local storage unit 7 for certain operations. It is also gated into dynamic condition register 53 by dynamic condition register control 52. Dynamic condition register 53 performs some dynamic tests on the condition of the Z bus at the completion of machine cycles that use the ALU. These include word types one, two and three. The types of testing that can be done are as follows: set a bit if the high portion of the Z bus is zero; set a different bit if the low portion of the Z bus is zero. The logical AND of this becomes the Z bus equals 0 condition. The dynamic condition register also samples the condition of the bit carryout 41*b* of ALU 41. The dynamic condition register also indicates the fact that an adder overflow condition occurs if the carry out of the 0 and 1 bit positions on lines 97 and 98 are different.

ADDRESSING AND FUNCTION OF LOCAL STORAGE

Figures 4A, 5:
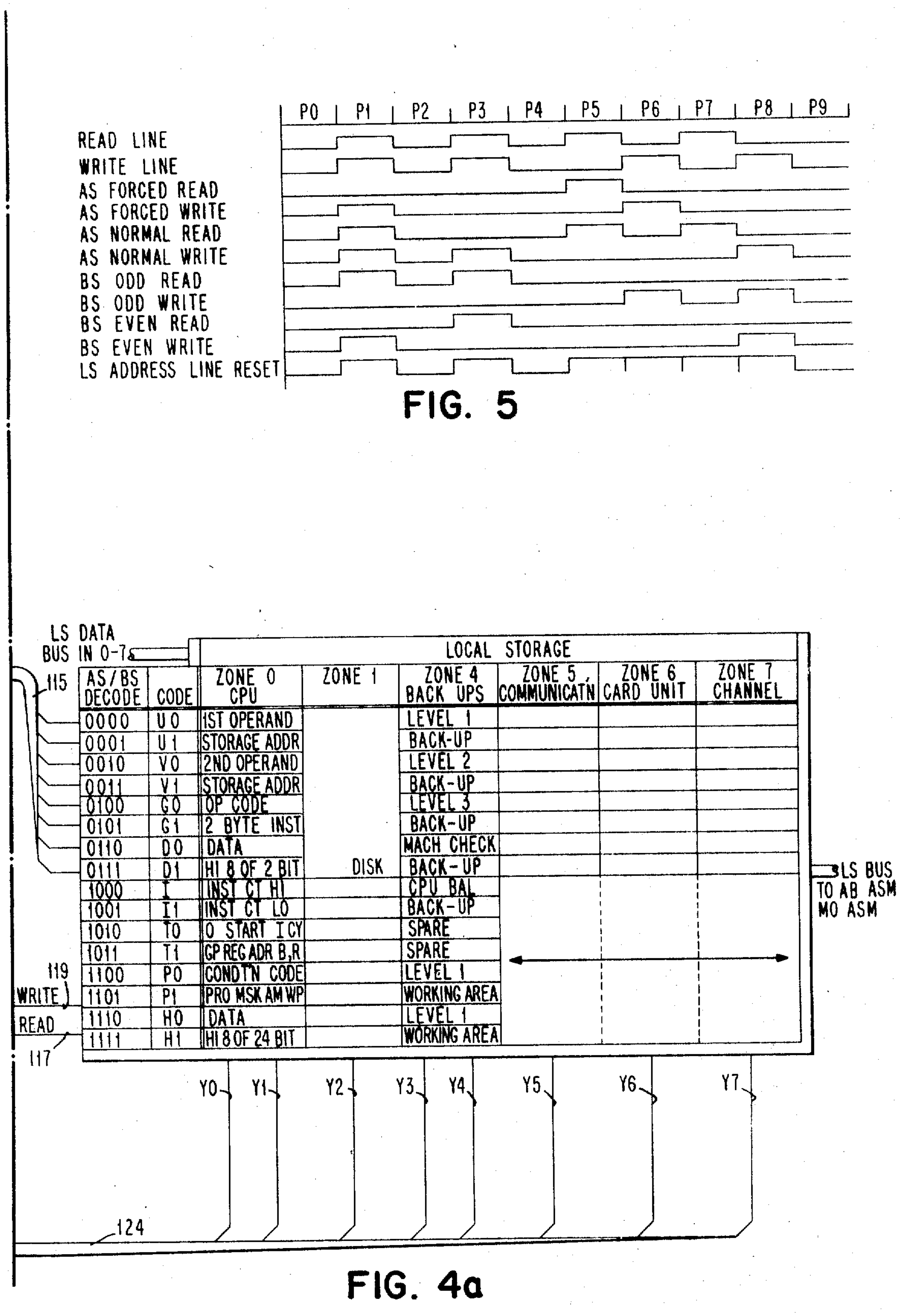
FIGS. 4*a* and 4*b* constitute a composite drawing illustrating the manner in which local storage addresses are generated.
FIG. 5 is a timing chart for the operation of local storage.
Figure 4B:
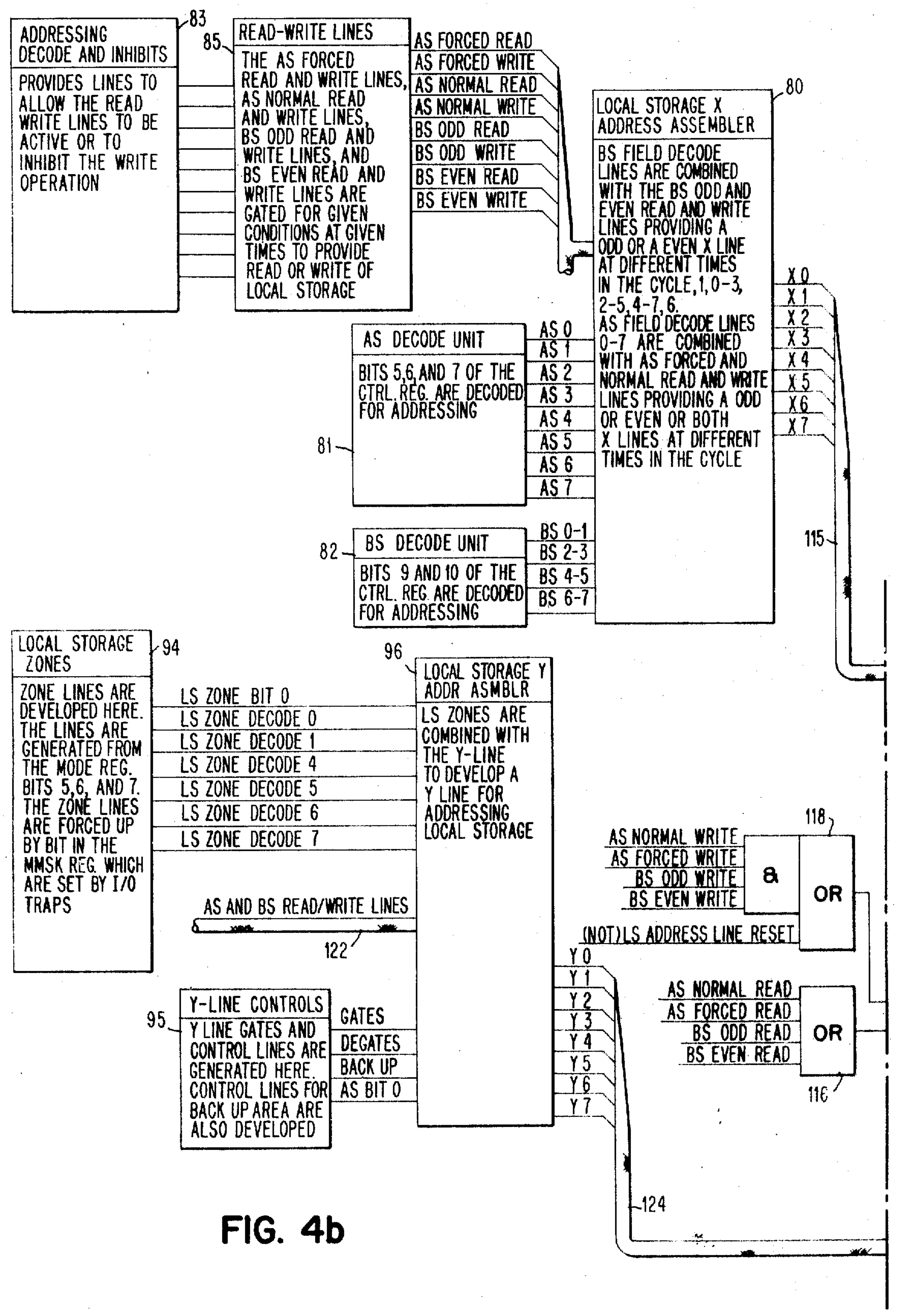
Figure 6A:
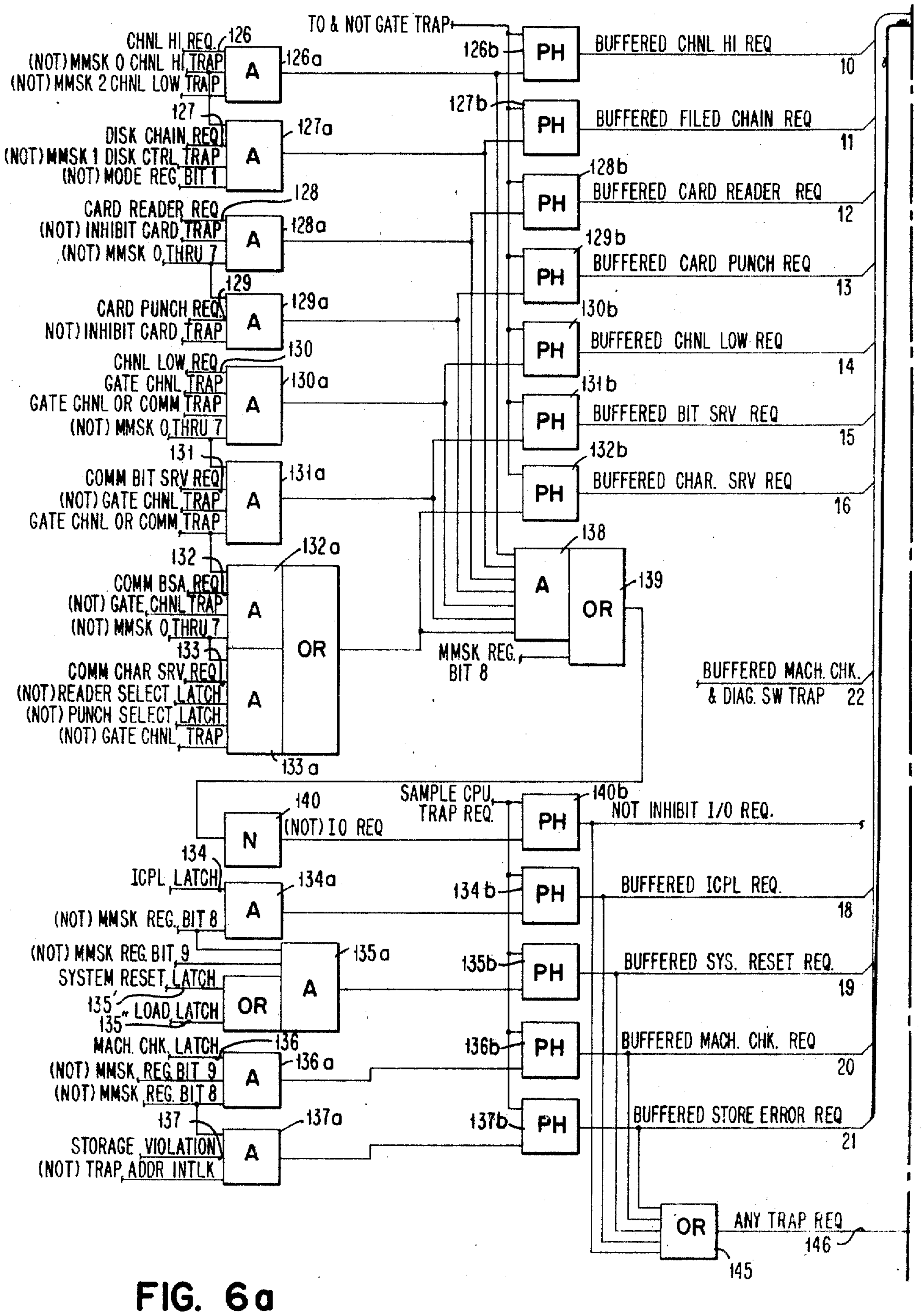
FIGS. 6*a* and 6*b* constitute a composite drawing illustrating the logic associated with the handling of trap requests and the way in which the first storage address of the trap microroutine is developed.
Figure 6B:
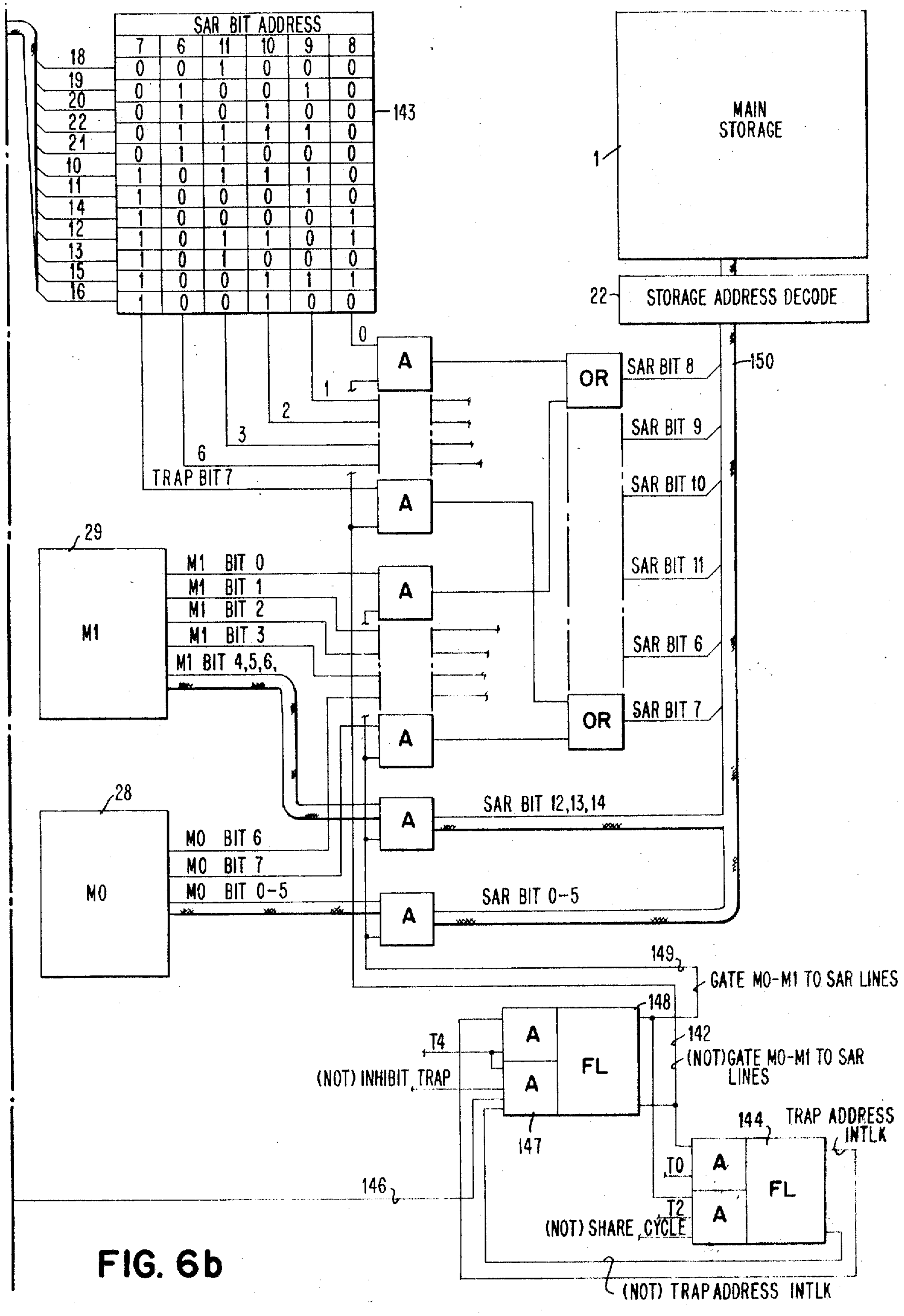

The addressing of local storage unit 7 is shown in FIGS. 4*a* and 4*b*. A particular register (byte) in local storage unit 7 is addressed by the coincidence of X and Y lines in I FIG. 4*a*. Taking zone 0, the CPU zone, as an example, the first byte would be selected by raising XO and YO, the second by raising X1 and Y0, etc., through X7 and Y0. The second eight bytes vertically in zone 0 would be addressed by the coincidence of XO and Y1, X1 and Y1, through X7 and Y1.

In zone 4, the backup zone of local storage, the level 1 backup or the U register (code U) is used to store the backup register for first level I/0 trap. This includes the channel low priority trap, the card reader and punch trap, and the communications trap. The level 2 backup or the Z register (code V) is used for a chain operation with a disk file. The level 3 backup register or the G register (code G) is used for the channel high priority trap backup. Machine check backup or register D (code D) is used when machine check traps are taken. In the event that a machine check signal is developed indicating an error has occurred, the address stored in the backup register is the address of the word during which the error occurred.

Backups are stored in zone 4 by the MMSK control word. Each trap which stores a backup executes a MMSK word type as the first word of its trap routine. As an example, the first word of the channel high trap routine would be a form that is mnemonically represented as follows: Link to G, MMSK 0=1. The MMSK word may apply to all registers in zone 4 including registers I, T, P and H, which may also be addressed in zones 5, 6 and 7. Registers U, V, G and D are most often used as backup registers. The majority of the registers in the lower portion of zones 4, 5, 6 and 7 are intended to be used as additional working area for those trap microprograms at level 1; i.e., the channel low priority trap, the card reader and punch trap and the communications trap. The P register in zones 4, 5, 6 and 7 has been reserved for a special function; that is, branch and link (BAL) function for the communications attachment. The communications attachment, because of the variety of line types which must be handled, requires a BAL function at a trap level. This is normally inhibited since only one backup register is available.

The I register is used for the normal CPU BAL backup. That is, provided an MMSK bit 0—6 is not on, a backup is stored in register I of zones 4, 5, 6 and 7. A backup register consists of the contents of MO M1 registers 28 and 29; that is, the address that would have been executed had not the trap occurred. Three bits of the M register are not required; that is, M1 bits 0 and 1 and M1 bit 7. In replacement of these bits, three dynamic conditions that are used by trap microprograms are stored. These are the high Z=0 condition dynamic condition bit 6, the low Z=0 condition which is dynamic condition register bit 7 and the adder carry condition which is dynamic condition bit 3.

The communications channel BAL function is a special case. Because the CPU cannot execute BAL function during an I/0 trap, the normal CPU BAL function is not available. Therefore, to facilitate a special backup, the following sequence of instructions would be exercised. A MMSK word is executed to sore a backup into the T register. When the MMSK function is used and it is not the first word of a trap, that is, it is in a normal stream of instructions, the address that would be stored would be the actual address of the MMSK word. Then a zone switch is made to zone 4, and the area, that is the T register, is incremented by two or four to create the return address from a subsequent subroutine.

In general, the addressing of local storage unit 7 is dependent on bit patterns in the control word resident in control register *6a*. The type of word influences the addressing decode and inhibit unit 83 and in addition the read-write line control 85. The word type determines whether a read or write reading into local storage is to be done and what time during the given cycle these functions are to be executed. The AS decode unit 81 is driven by bits in C register *6a* coinciding with the AS field in the control word; that is, bits 5, 6 and 7. The BS decode unit 82 is driven by bits 9 and 10 of the BS field again in C register *6a*. These bits feed the local storage X address assembler 80 and are gated with the appropriate read-write line signals so that the correct X address lines 115 are raised during a given machine cycle. The timing chart of FIG. 5 illustrates the portions of the clock cycle when the latches that are controlling the read-write lines, and gating both the X and addressing traps, may be active. The portions that may be active are dependent on the word types. The timing chart indicates all possible times during a machine cycle when different read or write latches may be up. Only one read or write latch may be up at one given time in the cycle. The different read addressing latches are combined in OR circuit 116 to form the local storage read line 117 and the different write addressing latches are combined in OR circuit 118 OR'ed together to form the local storage write line 119. Both OR circuits 116 and 118 are contained in local storage decode and inhibit gate unit 83.

The local storage zone address developed in local storage zone unit 94 is determined by bits 5, 6 and 7 of the mode register 44. However, should an I/0 trap be taken and a subsequent MMSK bit be turned on, the mode register bits 5, 6 and 7 are degated from the local storage zone path and a combination is forced dependent on the highest priority bit that is on in MMSK register 91. For example, MMSK bit 0 is the priority bit governing the channel high priority trap. The local storage zone that is forced for MMSK bit 0 is zone 7 or all bits being on. These lines are fed to local storage Y address assembler 96 where they are combined with the AS and BS read-write lines 122, as gating functions and the higher bit of either the AS field or BS field through Y-line controls unit 95 to form eight discrete Y address lines 124.

GENERATION OF TRAP REQUEST ADDRESS

FIGS. *6a* and *6b* illustrate the portion of the system which selects a trap request and generates the first storage address of the associated microroutine. The system includes a number of input AND gates 126*a*—137*a* which provide a gating function for each individual trap request. Certain signals are used to inhibit certain trap requests. These may either be the existence of MMSK bits indicating that a priority trap of a higher level is being executed or certain other conditions which are used to ensure that no trap will monopolize a trap level for an extended period of time.

The output of this gating function is sampled into a series of phase hold latches 126*b*-132*b*, 134*b*-137*b* and 140*b* at the time TO of every machine cycle, except that a machine cycle during which a trap is being taken is excluded. The outputs of the phase hold latches are combined and used to establish a bit pattern which forces the system to address a specific word in control storage. This word would be the first word in control storage. This word would be the first word of the trap microprogram associated with a given trap request.

The means for initiating this operation consists of OR circuit 145 which combines all trap requests to generate the signal on line 146 called any trap request. This line is sampled at T4 time at AND gate 147 in an attempt to reset latch 148 which generates the gate MO M1 to SAR lines signal on line 149 leading to storage address assembler 21 (FIG. *3d*). The plus side of latch 148 gates the MO M1 register to lines 150 which lead to storage address decode unit 22. The not side of latch 148 on line 142 gates the bit pattern that has been established by the priority circuitry 143 from the phase hold trap request buffer latches. Trap address interlock latch 144 is used for timing purposes to guarantee that latch 148 will remain reset for only one cycle.

The particular M1 and MO register bits that are affected by trap requests are bit 0, 1 2 and 3 in M1 register 29 and bits 6 and 7 in MO register 28. Bit 7 is forced for all I/0 traps and bit 6 is forced for CPU trap requests such as ICPL request, a system reset request, machine check request or storage error request. Bits 0, 1, 2 and 3 are forced dependent on the particular I/0 or CPU trap that is of the highest priority. The table representing the output of priority circuitry 143 shows the specific bit patterns that are forced on line 150.

The I/0 trap requests include a channel high request 126 indicating a data transfer on the channel when that channel is a burst channel. The channel high request line 126 at AND gate 126*a* is gated by not MMSK 0 bit which indicates that no other channel high request microprogram is in progress and it is therefore not necessary to wait until it is completed before a channel high request can be started. MMSK bit 2 indicates that a channel low priority request is in progress and are interlocked because, even though they have different priority requests from a systems standpoint, only one can be handled at a time. The disk chain request line 127 at AND gate **127*a* is used to initiate microprograms to handle the chaining function on the disk attachment. The gating functions to AND gate 127*a* are not MMSK 0 which indicates that no channel high trap microprogram is in process. The disk chain request 127 is also gated by not MMSK 1** which indicates that a previous disk microprogram is not in progress. The not Mode register bit 1 gate for the disk chain request is used to inhibit this trap when operating in a particular emulator mode.

The card read request line 128 is gated by not inhibit card trap to prevent two successive card traps from occurring and thereby allowing lower priority traps to be handled between two successive traps. Not MMSK 0—7 indicates that either no microprogram trap or card trap is in progress. MMSK bit 7 is a general MMSK bit used to prevent traps from occurring during a specific period of time.

The card punch request line 129 is gated by the same signals gating the card read request trap.

The channel low request line 130 is gated by a signal called gate channel trap which is the output of a latch that is switching on a cyclical basis from an off state to an on state. This provides alternative action between the handling of channel and communications traps so that one does not monopolize a given trap level. Gate channel or communications trap signal is significant only when the card device is in the process of taking trap. During this period, a communications channel low trap will only be allowed to occur during the cycle immediately following the completion of a card read or punch trap. The other condition is not MMSK 0—7 indicating conditions as previously stated.

The communications bit service trap request on line 131 is gated by essentially the same gates as those for the channel low request with the exception that instead of the gate channel trap line, this particular trap is gated with a not gate channel trap; that is, the opposite phase of the flip-flop circuit being used to govern the interaction of channel low and communications traps.

The communications BSA (bisynchronous adapter request on line 132 is gated with the same conditions as the communications bit service request on line 131. The attachment guarantees that a communications bit service and a bisynchronous request will not be up simultaneously.

The communications character service request on line 133 is gated by the same functions as both the channel low request 130 and communications bit service request 131 with one additional inhibit. This is that during a period when the card punch or reader is in the process of requesting traps, signified by the reader select latch or the punch select latch being up, the communications character service request 133 will be prevented from causing a trap.

Those traps classified as CPU traps, that is ICPL, system reset, machine check or storage error violation request, are also gated by different functions. The ICPL latch request 134 is gated by not MMSK register bit 8 This is to guarantee that the ICPL button on the console will take one trap and only one trap.

The system reset request trap signal on line 135′ or load request trap signal on line 135″ is taken either because of the depression of the system reset key on the console or the depression of the load key on the console. And in each case the MMSK 9 bit being on prevents the trap from being taken more than once for the same condition.

Machine check trap signal on line 136 is taken when the system is running in process mode and a CPU error is detected and neither MMSK bit 8 or 9 is in an on state. MMSK 9 is used to prevent the machine check trap to be taken more than once for the same error and MMSK register bit 8 indicates that either an ICPL trap load trap or system reset trap is in progress. In these cases it is not desired to take a machine check trap but to stop. The storage violation request latch signal on line 137 is gated by the MMSK register bit 8 being off which is a general purpose MMSK bit blocking all traps, and not trap address interlock. This is done so that the condition causing the storage error request may remain set for only that period of time during which it is required to take the storage error request trap. The requests for this particular trap are reset at T7 of the second cycle of this trap routine.

AND gate 138 is conditioned by the outputs of the various I/0 gates. The output of AND gate 138 is combined with bit 8 of the MMSK register in OR circuit 139. The output of OR circuit 139 is applied through inverter 140 to phase hold latch **140*b***.

Each of the phase hold latches **134*b*—137*b* and 140*b*** are sampled by the Sample CPU trap request signal.

TRAP MICROROUTINE HANDLING

Figure 7:
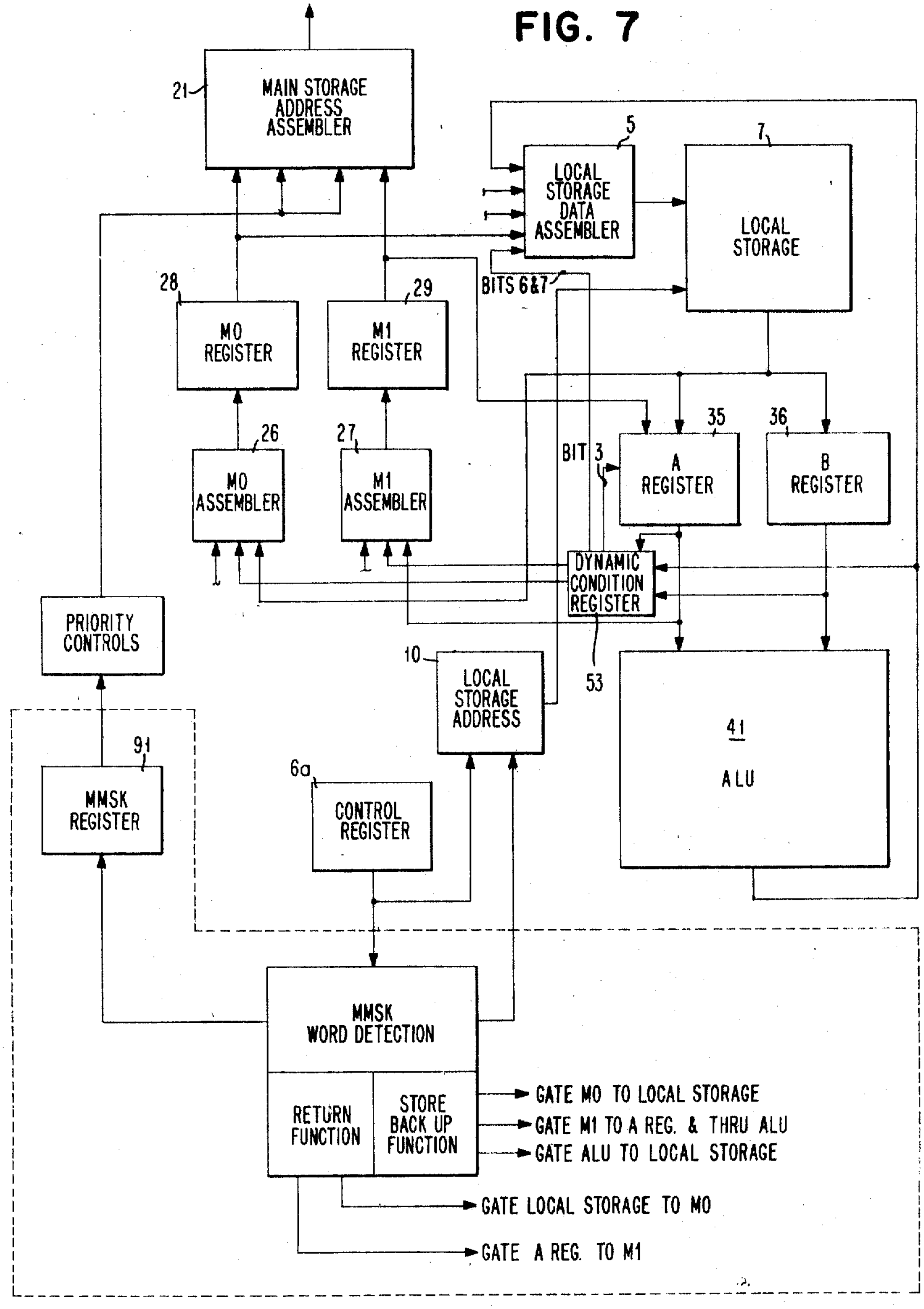
FIG. 7 details the elements of the system which are utilized in the handling of a storage address representing the first instruction of a trap microprogram.

FIG. 7 shows the system components used to handle the first instruction of a trap microroutine. The MMSK control word in control register **6*a* is used to store a backup register into zone 4 of local storage unit 7. At T1 of the cycle, MO register 28 is stored into local storage unit 7 through local storage data assembler 5. At this time bits 6 and 7 of dynamic condition register 53 are inserted in what normally are bits 0 and 1 of MO register 28. Also at T1 time, the M1 register 29, with bit 3 of the dynamic condition register inserted in bit position 7 of the M1 register, is stored in A register 35. These insertion operations are performed in the local storage data assembler 5 and A B register data assembler 11. A Subsequently, the quantity is passed through ALU 41 with no modification and sorted into local storage unit 7 through local storage data assembler 5 at T6 time of the cycle. The particular register in local storage zone 4 used for this purpose is determined by the address field in the control word. The address is specified by bits 8, 9 and 10 of the control register 6*a*. In addition, at T4 time of the cycle the selected bit in MMSK register 91 is turned to a 1** state.

The MMSK control word is also used to restore a backup register. At T1 time of the cycle an access is made to the backup register in local storage unit 7 as specified by bits 8, 9 and 10 of C register **6*a*. The odd portion of the backup register is accessed first. At T1 time the contents of this register are placed in A register 35. At T3 time the even portion, or MO backup of the register in local storage, is sorted into B register 36. At T4 time both the local storage data bus out lines and the A register are gated in parallel into the MO and M1 registers 28 and 29**, since the data for the second storage access is still available on the local storage data bus out line.

The bits of dynamic condition register 53, which were previously buffered in the storage locations, now reside in A register 35 and B register 36. Bits 6 and 7 of dynamic condition register 53 are buffered in bits 0 and 1 of B register 36. Bit 3 of the dynamic condition register 53, that was previously stored, is buffered in bit 7 of A register 35. At T8 time of the cycle these three bits are sampled or restored into dynamic condition register 53. Also at T4 time of this cycle the selected MMSK bit is turned off. In general, when the MMSK store backup and return backup functions are used as the first and last word of the trap microprogram, the back up that is stored initially is the address of the microprogram instruction that would have been executed had not the trap occurred. The dynamic condition bits that are stored are those that were the existing dynamic condition register bits at that time. The other bits in dynamic condition register 53 that change on a cyclic basis are not backed up but are prevented or inhibited from changing during the execution of an I/0 trap. Finally, the function of the MMSK control word which restores the backup is to return control of the microprogram to the microprogram that was in process when the trap originally occurred.

ENTRY OF BITS INTO MMSK REGISTER

Figure 8:
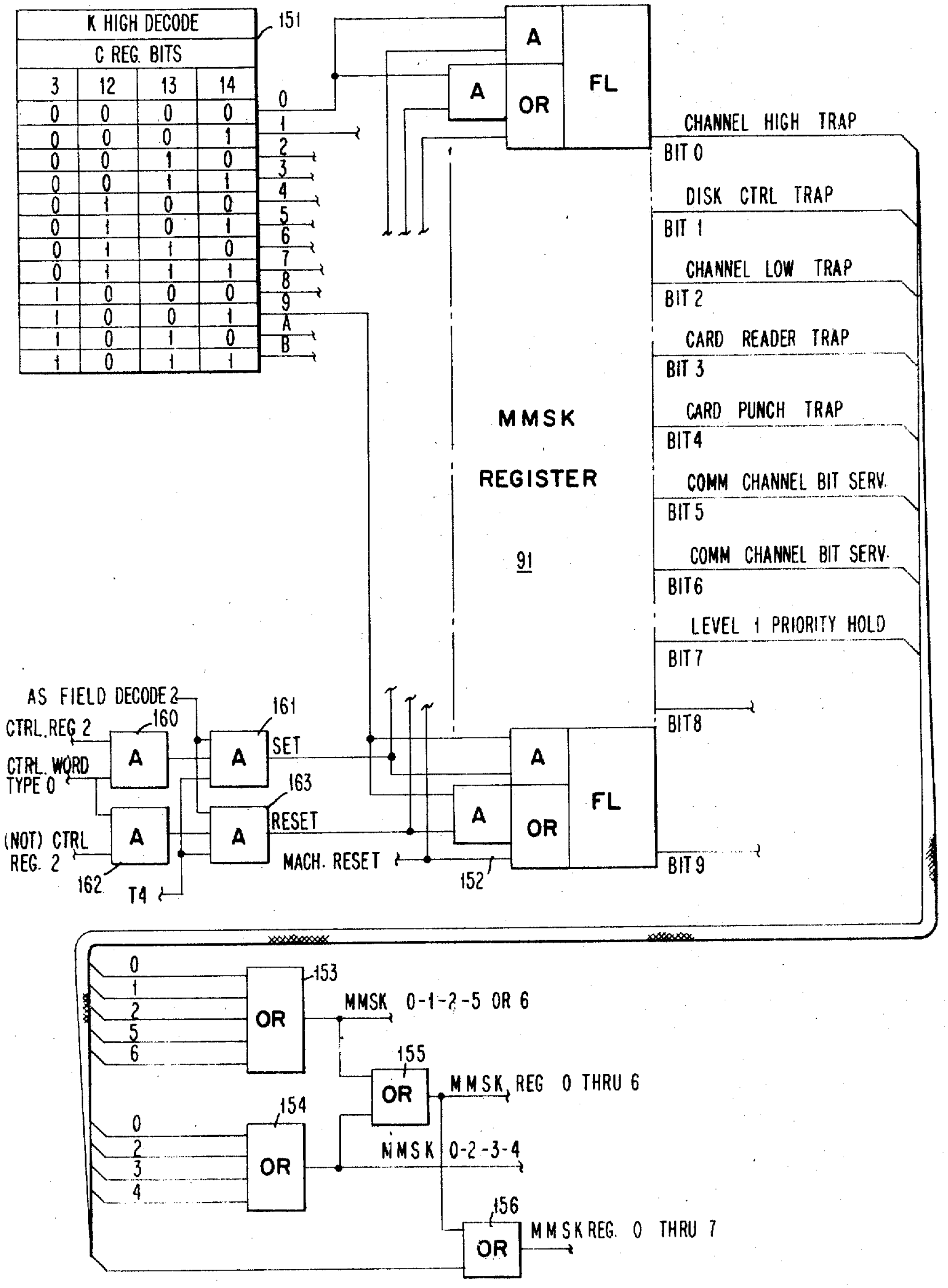
FIG. 8 illustrates that portion of the system which is effective to generate a bit pattern in the MMSK register in response to a particular word in the control register.

FIG. 8 illustrates the manner of entering bits into the MMSK register. The MMSK control word bits 3, 12, 13 and 14 in C register **6*a* are decoded in unit 151 to select one of a possible 16 different MMSK bits. Bit 2 of the MMSK control word is used to signify whether the operation is to set the selected MMSK bit or to reset it to the off condition. If bit 2 is a 1 the MMSK bit is set on; if bit 2 is a 0 the bit is reset to off. This decode is performed by the AND gates 160—161 and 162—163 feeding the Set and Reset lines. As an example, if the MMSK word contains a bit combination of 0000 in bits 3, 12, 13 and 14, and control register 6a bit 2 is a 1, bit 0 of MMSK register 91 is set to a 1 state. This is done at T4 time. If the combination in control register 6a was bits 3, 12, 13 and 14 equal to 0000 and control register 6a** bit 2 is 0, this would reset MMSK bit 0 at T4 time.

The entire MMSK register 91 is reset; that is, set to logical 0's, with a machine reset signal on line 152. The decode of the MMSK register bits in OR circuits 153, 154, 155 and 156 is used for two purposes. First, it is used to develop common gate, MMSK register 0—7, to inhibit a trap at level 1. The other outputs of this circuitry are used to degate Mode register 44 from local storage zone decode 94 and force a bit pattern into local storage zone unit 94 dependent on the highest priority MMSK register bit that is in an on state.

INPUT OUTPUT CYCLE STEAL

Figure 9:
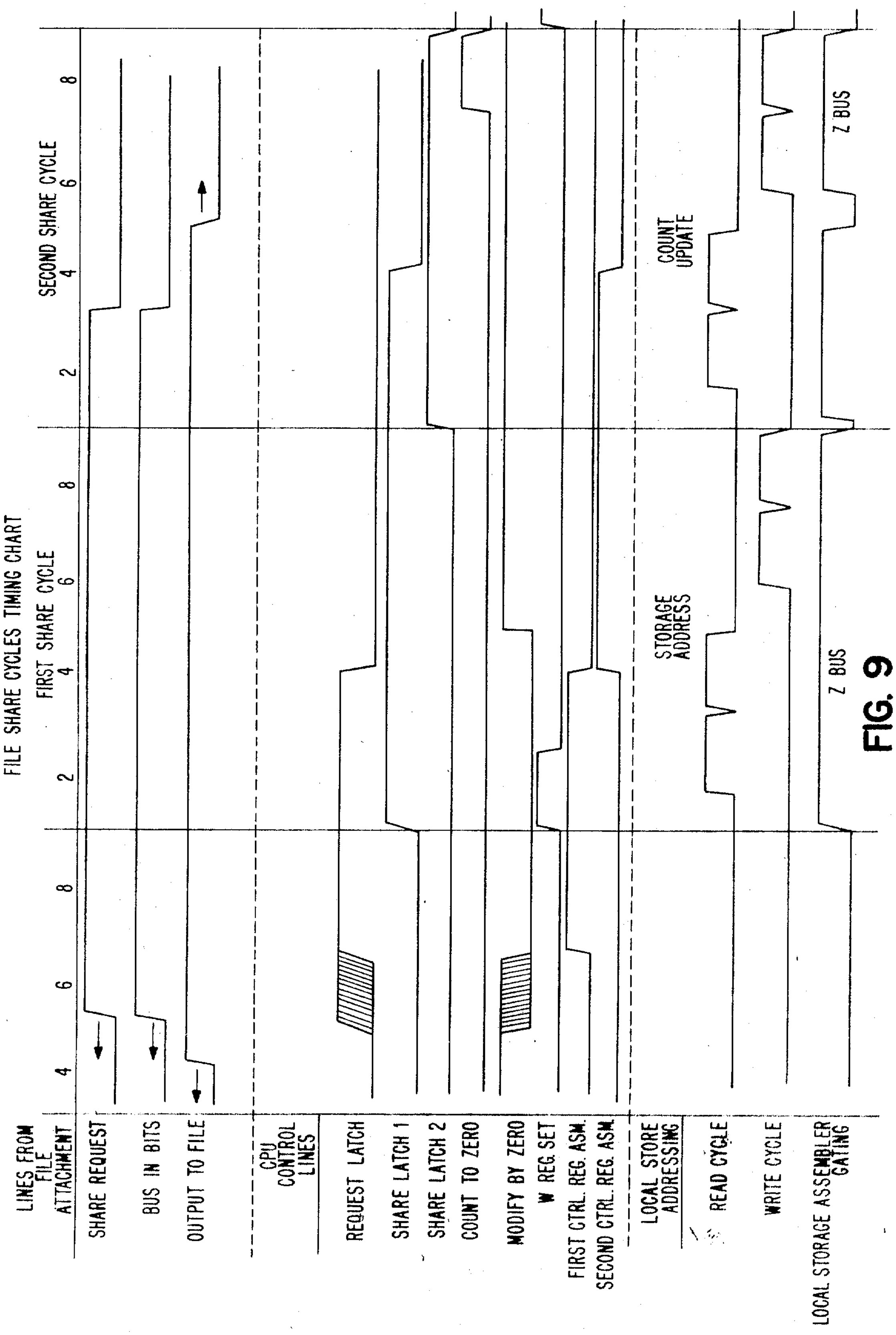
FIG. 9 is a timing diagram for the operation which involves the forcing of a control word into the control register without access to control storage.
Figure 11:
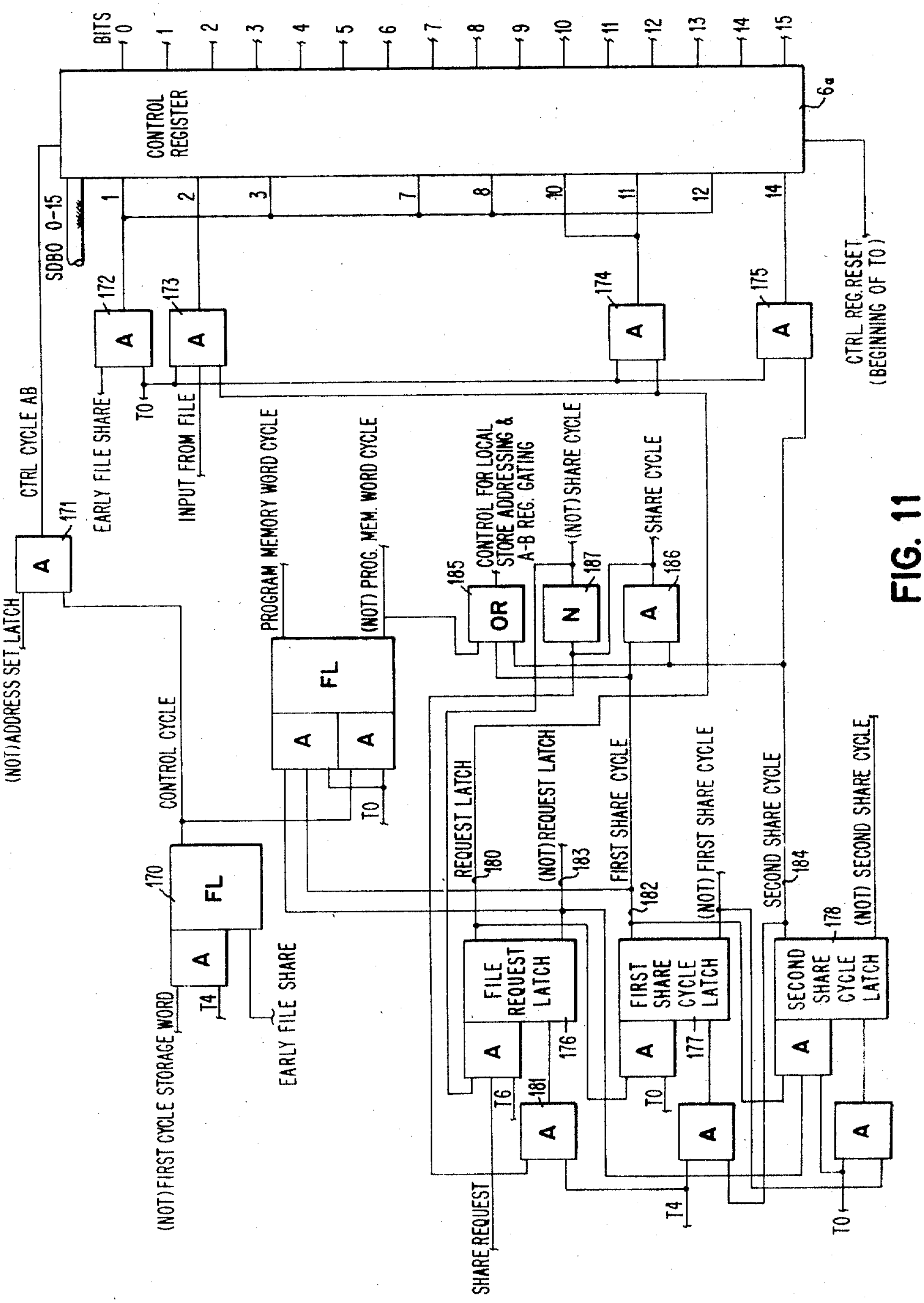
FIG. 11 is a detailed schematic drawing of the logic associated with the portion of the system which allows an external event to force a number of control words into the control register without access to control storage.

FIGS. 9, 10 and 11 are descriptive of that portion of the system which forces words into C register 6a without access to main storage 1. The function of the circuitry shown in FIG. 11 is to interrupt the current microprogram for two cycles and force two special control words into control register 6a for the purpose of transferring data between memory and the disk file. The forced control words update both the data address and the count portions of the channel control word under which the data transfer is being performed. A control signal is activated by the disk file when it is ready to transfer data to or from memory. This is called the share request and is shown in FIG. 9. This request is sampled into file share request latch 176 at T6 time of machine cycles except for the first cycle of a storage word, during which it is inhibited.

The setting of request latch 176 in the CPU initiates the setting of two timing latches which distinguish the first file share cycle from the second file share cycle. File share latch 177, which identifies the first file share cycle, is up from the T0 time following the set of file share request latch 176 to T4 time of the second share cycle. File share latch 178 comes up at TO time of the second share cycle and falls at the end of the second share cycle. These signals are used to gate bit patterns associated with the first and second share cycles into the C register 6a. Both bit patterns that are forced during the two cycles resemble a double byte modified word; that is a function of control word type Two. However, they are slightly modified to allow an additional memory access to overlap these two cycles.

A first control cycle resembles a double byte modify function in that a half word register in local storage zone 1, the disk file local storage zone, is incremented by 1. This is the address register used to hold the data address of the area in main storage 1 to be accessed. In parallel with this modification the unmodified address is set into MO M1 register 28 and 29 through the MO M1 data assemblers 26 and 27. A read call is then given to main storage 1 using this address. Subsequent operation depends on whether the operation is an input or output operation, as determined by control circuitry in the disk file, For input operations the disk file data is gated through main storage data assembler 2 to main storage data register 31. For output operations, the selected byte, that is the byte that is being addressed from main storage, is gated through the local storage data bus in (LSDBI) onto the external bus out and is sampled into a data register in the disk file.

During the second share cycle control register 6a is forced to a bit pattern that decrements the register in local storage zone 1 containing the count field of the CCW. The count field is read out into AB registers 35 and 36, decremented by 1 and stored back into local storage unit 7. The timing for this particular cycle is identical to that for the double byte modify function of word type Two. During the file cycle steal operation, The WO and W1 registers 24 and 25, which are normally updated on a cyclic basis, are prevented from being updated by the signal for file request latch 176 which is the zero update write inhibit signal input to storage address modifier 23, so that they always contain the address of the first instruction to be executed after the file share operation is completed.

At T4 time of the second share cycle the value in WO W1 register 24 and 25 is gated through MO M1 assembler 26 and 27 into MO M1 register 28 and 29 and the interrupted microprogram continues. During the second share cycle a special 0 detect function is performed on the double byte data that is used as a count field. This is a zero test used to indicate when the data count has gone to zero indicating the completion of the data transfer. The file cycle steal controls of FIG. 11 degate the path into control register 6a from the storage data bus out and gate circuitry that forces the different bit patterns for the two cycles used in input and output operations. The file cycle steal operation, in addition to being inhibited during the first cycle of a word type Two storage word is also inhibited during the first cycle of a trap routine. In order to substitute a forced bit pattern into C register 6a, it is first necessary to degate the normal source of such data. This is accomplished by means of control cycle latch 170. This latch is normally in the on condition but is reset by the early file share signal causing the output line of latch 170 to drop. This degates the normal data path to control register 6a by degating AND gate 171. With no control cycle A3 signal, control register 6a is degated from SDBO. Since control register 6a is automatically reset at the beginning of every cycle, the information in control register 6a may now be supplied from an alternate source.

In the case of a read operation it is necessary to gate a 1 into bit positions 1, 2, 3, 7, 8, 10, 11 and 12 at TO time. This pattern is shown in FIG. 10. The bit pattern is forced by AND gate 172, which sets bits 1, 3, 7, 8 and 12 together with AND gate 173 conditioned by TO timing pulse, the input from file signal, and the output from file request latch 176 to set a 1 into the bit 2 position. Bits 10 and 11 are turned on by the output of AND gate 174 which is conditioned by TO pulse and the output from file request latch 176. The file request signal applied to AND gates 173 and 174 turns the bits on for a first share cycle only while early file share signal applied to AND gate 172 turns the bits on for both cycles.

The second read cycle requires a slightly different bit pattern which involves the dropping of the bits in the positions set on by AND gates 173 and 174, and the setting of a bit in bit position 14. Bit position 14 is set to a 1 by AND gate 175 which is conditioned by a TO pulse at the beginning of a second cycle together with the second share cycle signal.

The difference between a read and write operation is determined by AND gate 173 which has as one input the input from file signal. In the absence of this signal, bit 2 is not set. Therefore, a write operation distinguishes from a read operation only by the absence of bit 2 in control register 6a.

It can be seen that the important signals in the setting of this bit pattern are the first and second file share signals. These are developed by the inputs to the file request latch 176, the first share latch 177 and the second share latch 178. File request latch 176 is set on by a share request signal and not a share cycle signal at T6 time. The output of file request latch 176 provides a conditioning signal on line 180 to allow the first share cycle latch 177 to be turned on at TO time. The output of file request latch 176 is also applied as an input to AND gates 174 and 173. This, in combination with the early file share cycle signal applied to AND gate 172, is operative to set the bit pattern in control register 6a at the beginning of a file share cycle.

File request latch 176 is reset at T4 time of the first share cycle. This is accomplished in AND gate 181. This enables second share cycle latch 178 to be set at TO time of the second share cycle by a combination of the outputs of the first share cycle latch 177 on line 182, the off side of file request latch 176 on line 183, and a TO pulse. This is effective to bring up an output signal on line 184 indicating the second share cycle. This signal is applied as an input to N AND gate 175 to change bit 14 and distinguish between the first and second share cycles.

Gates 185, 186 and inverter 187 are used to develop various timing signals used in addressing local storage unit 7. The combination of share latches 177 and 178 being on, in conjunction with the B source decode, operates to select a B register and T register in the local storage unit. The A source field is used to indicate the byte mode in and out of memory.

DATA TRANSFER WITH FORMATE MONITOR

Figure 12:
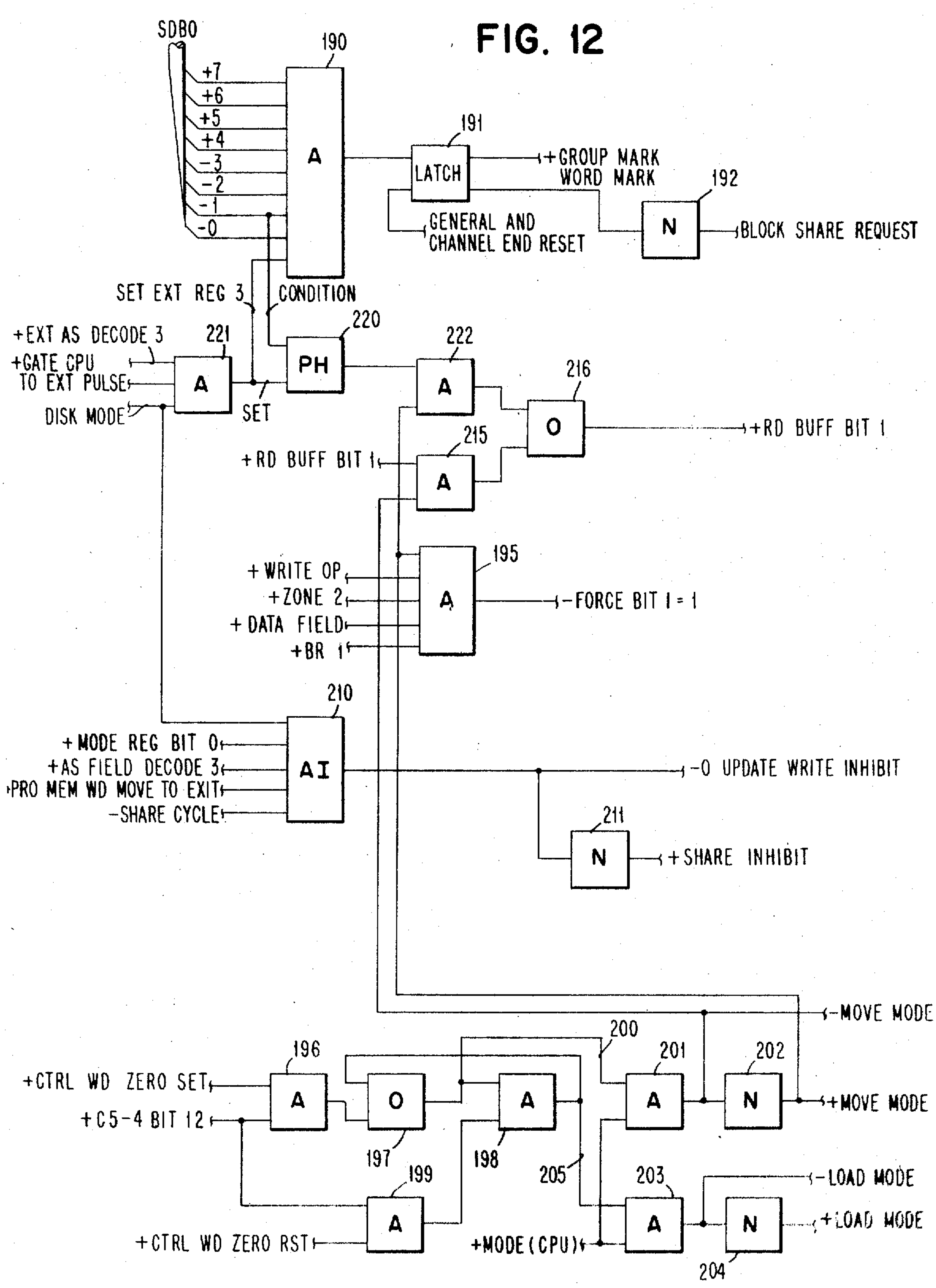
FIG. 12 is a schematic drawing of the logic associated with the microprogram loop which allows data to be transferred between an input-output device and the CPU while preserving the arbitrary division of storage by special characters.

The purpose of the logic shown in FIG. 12 is to allow data to be transferred from an I/O device such as a file into core memory within the CPU while preserving the arbitrary division of core by word marks and group mark word marks or any other arbitrary set of characters which may be selected.

A two instruction loop contained in control memory causes the CPU to fetch a character from the addressed location in main storage. This character is then investigated to determine whether or not it is a group mark work mark or simply a word mark. These special characters are either regenerated or stripped according to the mode of operation. In the move mode, for example, the word marks are not changed. The function of the word mark is to separate instructions and data fields.

The data read from core at the addressed location is investigated to provide an output signal if the character is a group mark work mark. The character from the I/O device is applied to the buffer circuitry. In the event that it is desired to retain the special character in core, the data read from the file is appropriately modified in the buffer before it is placed in core. The prefetching of the data in core allows the character to be modified without a sacrifice in time since only the logic delays are involved.

The first instruction of the two-word microinstruction loop normally increments the data address in main storage. The incrementing portion of this first instruction is inhibited until a file share cycle signal is developed. This means that the character has been read from the file, compared to the content of the address in main storage and regenerated. At this time it is appropriated to increment the address in main storage and fetch the next character for the purpose of examining it to determine whether or not it includes a word mark or is in fact a group mark word mark. The two-word microinstruction loop is repeated until a group mark word mark is detected. This causes an exit from the two word loop by terminating the file operation. This is effected by a positive signal output on the block share request line.

The T register is physically located in local storage unit 7. The data contained in the T register is the address to be accessed in main storage. The characters are read from the file at 6 microsecond intervals. This approach to the problem combines the best features of microinstructions and hardware. A completely hardware implementation would involve an undue amount of hardware whereas a complete microinstruction approach would consume excessive amounts of time. With this solution a small amount of hardware is able to do the job in a minimum amount of time

FILE SHARE CYCLE

AND gate 190 connected to the storage data bus out is conditioned by the bit pattern illustrated at the input. This bit pattern corresponds to a group mark word mark, one of the special characters used to segregate main storage and to set word mark latch output signal. The output of the AND gate 190, conditioned by the group mark word mark character, sets latch 191 to provide a plus group mark word mark output signal. Latch 191 is reset by the General and chain end reset signal. The group mark word mark signal is fed to inverter 192 to provide a signal which is operative to block further file cycle share requests.

During a write operation in the move mode, it is desired to strip word marks from the data being supplied to the disk file. AND gate 195 is operative to achieve this end. It is conditioned by signals representing move mode, a write operation, a zone 2 signal which identifies it as a data field, a data field signal which distinguishes from a zone 2 field and a bit ring 1 signal indicating that the bit 1 time is present on the file write circuitry. The force bit 1=1 signal then operates to force a 1 into the bit 1 position of the read buffer. When the move mode and load mode signals are derived by means of microprograms, the inputs to AND gate 196 are control words type Zero and a line conditioned by a particular bit pattern existent in the C register 6*a*. The outputs of OR circuit 197 and AND gate 199 cooperate with the AND gate 198 to provide a latching operation and prevent an output signal on line 200. This signal is combined in AND gate 201 with a mode signal from the CPU. The mode signal is derived from a bit present in the mode register which indicates that the system is operating in a particular mode. The output of AND gate 201 is a signal minus move mode indicating that the operation is a move mode type operation. Inverter 202 operates to provide the inverted signal also indicating that the system is operating in a move mode. AND gate 203 and inverter 204 operate to generate a signal indicating that the system is operating in load mode which is the inverse of move mode. In other words, when the latch made up of AND gate 198 and OR circuit 197 is not on, the signal on line 205 will be low, the load mode signal will be developed at AND gate 203 by the presence of a particular mode bit in the mode register.

The latch including AND gate 198 and OR circuit 197 may be reset by a control word type Zero reset. As mentioned previously in the discussion relating to the two instruction disk file loop, it is not desired to increment the address unless the data is actually transferred between the file and the CPU. The circuit which is operative to prevent the update during cycle steal is the 0 update write inhibit which is supplied to the storage address modifier during a regeneration of the address to prevent an incrementing operation. In other words, the address is restored as read. This signal is derived by means of an AND gate 210 which combines a disk mode signal, the bit 0 in the mode register indicating a particular mode of operation, and A source field decode 3 indicating that the third external bus is active, a program memory work move to external which indicates that a word in main storage which does not reside in the control area is to be moved to an external device, and a signal indicating that a disk share cycle is not taking place. The output of AND gate 210 is the minus 0 update write inhibit signal. This signal is applied to inverter 211 to provide a plus share inhibit signal.

The plus read buffer bit 1 signal is applied to the main storage on line 57 (FIG. 3*a*). This bit is applied if storage had a word mark in this position, because it is desired to maintain the word mark in this position. It is necessary to synthesize this bit because in move mode there would be no bit in this position as the data comes from the file. It is therefore necessary to combine the signal from this bit in the data as it comes from core with a signal indicating the operation is in move mode. This is done in AND gate 215 which feeds to OR circuit 216 to provide a plus read buffer bit 1 signal. Polarity hold circuit 220 is conditioned by the input from bit 1 position on the SDBO. The first control word in the microprogram loop provides the plus external AS decode 3 signal and the plus gate CPU to external code signal. These are combined with the disk mode signal in AND gate 221 to set polarity hold circuit 220 and to set the value on SDBO into external register 3.

When polarity hold circuit 220 is set, it is combined with the phase move mode signal in AND gate 222 which then develops a plus read buffer bit 1 through OR circuit 216. Polarity hold latch 220 is reset between bits, therefore, if storage did contain a word mark bus bit 1 would be at the low level and latch 220 would not be set.

While the invention has been particularly shown and described with reference to a preferred embodiment thereof, it will be understood by those skilled in the art that various changes in form and details may be made therein without departing from the spirit and scope of the invention.

What we claim is:

1. In a data processing system having a logical configuration determined largely by the control word contained in a control register,
  main storage means containing a plurality of control words sequentially arranged according to the operations to be performed,
  a storage address register connected to said main storage means for specifying the accessed location,
  modifier means connected to said storage address register for incrementing an address in said storage address register,
  means for developing a cycle steal request signal,
  means responsive to said cycle steal request signal for inhibiting the operation of said modifier means, and
  means connecting said means responsive to said cycle steal request signal to said control register means, said means responsive to said cycle steal request signal being further responsive to said request signal to successively force at least two different control words into said control register.

2. The combination according to claim 1 further including,
  buffer means connected to said modifier means for storing an address incremented by said modifier means—, and
  means for transferring the modified address from said buffer means to said storage address register.

3. The combination according to claim 1 wherein said means for developing a cycle steal request signal is connected to an input-output device to develop said signal in response to a demand for service.

4. The combination according to claim 1 including means for connecting said means for developing a cycle steal request signal to an input/output device, said means for developing a cycle steal request signal developing said signal in response to a demand for service from said device.

5. In a data processing system having a main storage unit and a control word register,
  a local storage unit having a plurality of addressable zones, each zone containing a plurality of addressable words representing storage addresses in said main storage units,
  local storage address assembler means for generating word and zone addresses for said local storage unit,
  a mode register connected to said address assembler means for specifying the zone address, said mode register containing data indicating the type of operation of said system, and
  gating means directly connecting said control word register to said local storage address assembler means for specifying the word address.

6. The combination according to claim 5 wherein each zone of said local storage unit contains the main storage address of an instruction in a sequence related to the system operations which utilize the zone.

7. The combination according to claim 5 further including,
  an address modifier for said main storage unit, said modifier operating to increment the main storage unit address to address the next succeeding location,
  branch detecting means responsive to the output of said control register means for developing a signal indicating the beginning or end of a branch routine,
  means connected to said local storage address assembler means and responsive to said branch detecting means for developing a predetermined word address in local storage, and
  means responsive to said control register means and said local storage address assembler means for storing said incremented main storage unit address at said predetermined word address in said local storage unit.

8. The combination according to claim 7 wherein said predetermined local storage word address is the same for a plurality of zones.

9. The combination according to claim 5 further including,
  a MMSK register for specifying the zone address, means responsive to said control register for entering data into said MMSK register, and
  trap control means responsive to said MMSK register for degating said mode register from said address assembler means and substituting said MMSK register therefor.

10. The combination according to claim 9 wherein the data entered into said MMSK register by said means responsive to said control register is fetched from said main storage unit.

11. The combination according to claim 9 wherein said means for entering data into said MMSK register comprises,
  means for monitoring trap requests,
  address generating means responsive to said monitoring means for developing a main storage address representing an active trap request, and
  means for fetching the data from said main storage address and entering a portion thereof into said MMSK register.

12. The combination according to claim 11 wherein said address generating means is operative to generate main storage addresses awarding priority to the most significant of contending requests by generating the highest value address in response to the highest priority request, whereby the significance of lower priority lower value addresses is eliminated through redundancy.

13. In a microprogrammed data processing system having a central processing unit, a storage unit and at least one input/output device, means for performing an input/output data transfer operation comprising:
  a control register having a plurality of bit positions,
  control means connected to said control register to be responsive to the microinstructions contained in said control register for performing the logical operations specified by the microinstructions instructions in said control register,
  a microinstruction loop, comprising first and second microinstructions, contained in said storage unit,
  said control means including:
    a. storage access means responsive to a first plurality of predetermined bit positions in said first microinstruction for reading the character at a predetermined address in said storage unit,
    b. a comparison means, connected to said storage unit, responsive to said first microinstruction, for comparing the characters read from said storage unit to a bit pattern representing a predetermined set of characters and developing an output signal representing the occurrence of a character of said predetermined set,
    c. incrementing means operative to increment the predetermined address for deriving the location of the next character to be addressed,
    d. means for generating a share cycle signal indicating that a transfer of data between the central processing unit and an input/output device has been effected,
    e. means responsive to said first microinstruction and to the absence of said share cycle signal for inhibiting the operation of said address incrementing means, and
  means responsive to said second microinstruction to branch back to said first microinstruction.

14. The combination according to claim 13 further including means responsive to said output signal for terminating said data transfer operation.

15. The combination according to claim 13 further including means responsive to said output signal for modifying the data to be transferred.